US009678576B2

(12) United States Patent
Lovitt et al.

(10) Patent No.: US 9,678,576 B2
(45) Date of Patent: *Jun. 13, 2017

(54) USING PHYSICAL GESTURES TO INITIATE CALL TRANSFERS BETWEEN DEVICES

(71) Applicant: Microsoft Technology Licensing, LLC, Redmond, WA (US)

(72) Inventors: Andrew William Lovitt, Redmond, WA (US); Jason Ryan Farmer, Snohomish, WA (US); Michael Hall, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,043

(22) Filed: May 15, 2016

(65) Prior Publication Data

US 2016/0259425 A1    Sep. 8, 2016

Related U.S. Application Data

(63) Continuation of application No. 14/748,345, filed on Jun. 24, 2015, now Pat. No. 9,369,855, which is a
(Continued)

(51) Int. Cl.
*H04M 3/42*    (2006.01)
*G06F 3/01*    (2006.01)
(Continued)

(52) U.S. Cl.
CPC ............ *G06F 3/017* (2013.01); *H04M 1/006* (2013.01); *H04M 3/56* (2013.01); *H04M 3/564* (2013.01);
(Continued)

(58) Field of Classification Search
CPC .......... H04W 4/16; H04M 3/567; G06F 3/017
(Continued)

(56) References Cited

U.S. PATENT DOCUMENTS 5,946,386 A    8/1999 Rogers et al.
6,999,769 B1   2/2006 Henon
(Continued)

FOREIGN PATENT DOCUMENTS

WO    2007118250 A2    10/2007

OTHER PUBLICATIONS

"Non-Final Office Action for U.S. Appl. No. 13/918,530", Mailed Date: May 28, 2014, 9 pages.
(Continued)

*Primary Examiner* — Quynh Nguyen
(74) *Attorney, Agent, or Firm* — Medley, Behrens & Lewis, LLC

(57) ABSTRACT

Various technologies described herein pertain to using detected physical gestures to cause calls to transfer between client devices. A physical gesture between a first client device and a second client device can be detected (e.g., utilizing the first client device, the second client device, a disparate client-side device, a server, etc.). The first client device participates in a call, while the second client device is not participating in the call at a time of the detection of the physical gesture. Responsive to detection of the physical gesture, participation of the second client device in the call can be initiated. Participation of the second client device in the call can be initiated by causing the call to transfer from the first client device to the second client device or causing the second client device to join the call while the first client device continues to participate in the call.

20 Claims, 19 Drawing Sheets

Related U.S. Application Data continuation of application No. 13/918,530, filed on Jun. 14, 2013, now Pat. No. 9,100,488.

(51) Int. Cl.

| | | |
|---|---|---|
| *H04M 3/56* | (2006.01) | |
| *H04W 4/16* | (2009.01) | |
| *H04M 3/58* | (2006.01) | |
| *H04M 1/00* | (2006.01) | |
| *H04W 4/00* | (2009.01) | |
| *H04M 1/60* | (2006.01) | |
| *H04W 4/02* | (2009.01) | |

(52) U.S. Cl.
CPC ............ *H04M 3/567* (2013.01); *H04M 3/58* (2013.01); *H04W 4/008* (2013.01); *H04W 4/16* (2013.01); *H04M 1/6066* (2013.01); *H04M 2203/2094* (2013.01); *H04M 2203/5009* (2013.01); *H04M 2203/5018* (2013.01); *H04M 2203/5027* (2013.01); *H04M 2250/02* (2013.01); *H04M 2250/04* (2013.01); *H04W 4/023* (2013.01); *H04W 4/027* (2013.01)

(58) Field of Classification Search
USPC ....... 379/202.01, 212.01, 220.01; 455/414.1, 455/428
See application file for complete search history.

(56) References Cited

U.S. PATENT DOCUMENTS

| | | | |
|---|---|---|---|
| 7,257,217 | B1 | 8/2007 | Lee |
| 7,729,489 | B2 | 6/2010 | Lee et al. |
| 7,751,546 | B2 | 7/2010 | Poustchi et al. |
| 7,934,148 | B2 | 4/2011 | Bobo, II |
| 8,224,306 | B2 | 7/2012 | Allen et al. |
| 8,271,662 | B1 | 9/2012 | Gossweiler, III et al. |
| 9,100,488 | B2 | 8/2015 | Lovitt et al. |
| 2003/0003900 | A1 | 1/2003 | Goss et al. |
| 2006/0040692 | A1 | 2/2006 | Anttila et al. |
| 2011/0065384 | A1 | 3/2011 | Cader et al. |
| 2012/0077433 | A1 | 3/2012 | Walker et al. |
| 2013/0080525 | A1 | 3/2013 | Aoki et al. |
| 2013/0231054 | A1 | 9/2013 | Fry |
| 2013/0295929 | A1 | 11/2013 | Chin et al. |
| 2014/0070957 | A1* | 3/2014 | Longinotti-Buitoni A61B 5/6804 340/870.01 |
| 2014/0087705 | A1 | 3/2014 | Wooster et al. |
| 2015/0296355 | A1 | 10/2015 | Lovitt et al. |

OTHER PUBLICATIONS

"Response to the Non-Final Office Action for U.S. Appl. No. 13/918,530", filed Sep. 15, 2014, 17 pages.

"Final Office Action for U.S. Appl. No. 13/918,530", Mailed Date: Oct. 14, 2014, 9 pages.

"Response to the Final Office Action for U.S. Appl. No. 13/918,530", filed Feb. 11, 2015, 12 pages.

"International Search Report (ISR) & Written Opinion for PCT Patent Application No. PCT/US2014/041829", Mailed Date: Sep. 26, 2014, 12 pages.

"Response to the International Search Report (ISR) & Written Opinion for PCT Patent Application No. PCT/US2014/041829", Filed Date: Jan. 9, 2015, 8 pages.

"Notice of Allowance and Fees Due for U.S. Appl. No. 13/918,530", Mailed Date: Mar. 31, 2015, 5 pages.

Written Opinion for PCT Patent Application No. PCT/US2014/041829, Mailed Date: May 19, 2015, 5 pages.

"Supplemental Notice of Allowability for U.S. Appl. No. 13/918,530", Mailed Date: Jun. 18, 2015, 2 pages.

"Response to the Communication Pursuant to Rules 161(1) and 162 EPC for European Patent Application No. 14735798.2", Filed Date: Feb. 26, 2016, 11 pages.

"International Preliminary Report on Patentability for PCT Patent Application No. PCT/US2014/041829", Mailed Date: Sep. 17, 2015, 14 pages.

"Non-Final Office Action for U.S. Appl. No. 14/748,345", Mailed Date: Aug. 7, 2015, 11 pages.

"Response to the Non-Final Office Action for U.S. Appl. No. 14/748,345", filed Dec. 22, 2015, 15 pages.

"Notice of Allowance and Fees Due for U.S. Appl. No. 14/748,345", Mailed Date: Feb. 12, 2016, 5 pages.

* cited by examiner

USING PHYSICAL GESTURES TO INITIATE CALL TRANSFERS BETWEEN DEVICES

CROSS-REFERENCE TO RELATED APPLICATION

This application is a continuation of U.S. patent application Ser. No. 14/748,345, filed on Jun. 24, 2015, and entitled "USING PHYSICAL GESTURES TO INITIATE CALL TRANSFERS BETWEEN DEVICES", which is a continuation of U.S. Pat. No. 9,100,488, filed on Jun. 14, 2013, and entitled "USING PHYSICAL GESTURES TO INITIATE CALL TRANSFERS BETWEEN DEVICES", the entireties of which are incorporated herein by reference.

BACKGROUND

Conventional approaches for transferring a call from a first caller to a second caller or conferencing multiple callers into the call oftentimes involve performance of a complex sequence of steps. For instance, if attempting to conference more than one caller into a call, a user commonly places a first caller on hold, dials a second caller, and then conferences the first and second callers together on the call. To accomplish the foregoing, the user may need to have knowledge of the sequence of steps to enable carrying out such action. Thus, the user may need to know to press a particular button to place the first caller on hold, know the number of the second caller who is being added to the conference call, and then know to press another button to join the two calls together.

According to another illustration, a user may call a group of friends with whom she desires to talk. The user may call a particular friend from the group and begin to talk to that person. Upon finishing the conversation with that friend, the user may wish to talk to a next friend in the group. A common approach for enabling the user to talk to the next friend is for the first friend to hand her phone over to the next friend. Alternatively, a sequence of steps can be taken to transfer the call from the phone of the first friend to the phone of the second friend. However, similar to above, such approach may require prior knowledge of how to accomplish the transfer of the call.

SUMMARY

Described herein are various technologies that pertain to using detected physical gestures to cause calls to transfer between client devices. A physical gesture between a first client device and a second client device can be detected. The first client device can be participating in a call at a time of detection of the physical gesture. Moreover, the second client device is not participating in the call at the time of the detection of the physical gesture. The physical gesture can be detected utilizing the first client device, the second client device, a disparate client-side device (e.g., a sensor, etc.), a server, or the like. Responsive to the detection of the physical gesture, participation of the second client device in the call can be initiated. For example, participation of the second client device in the call can be initiated by causing the call to transfer from the first client device to the second client device (e.g., a transfer action). According to another example, participation of the second client device in the call can be initiated by causing the second client device to join the call while the first client device continues to participate in the call (e.g., a conference action).

In accordance with various embodiments, different types of physical gestures can be detected. For instance, the physical gesture between the first client device and the second client device can be a tap between the first client device and the second client device. According to another example, the physical gesture can be a motion of the second client device relative to the first client device and/or a motion of the first client device relative to the second client device. However, other types of physical gestures of the first client device and/or the second client device are intended to fall within the scope of the hereto appended claims. Moreover, according to other embodiments, it is contemplated that the physical gesture can be between an agent of the first client device and the second client device, between the first client device and an agent of the second client device, or between the agent of the first client device and the agent of the second client device.

Various embodiments set forth herein pertain to routing a call. For instance, data packets that are part of the call can be transmitted to the first client device. A request to route the data packets that are part of the call to a second client device can thereafter be received. The request can be responsive to a detected physical gesture between the first client device and the second client device. The data packets that are part of the call are not routed to the second client device prior to receipt of the request. Moreover, whether to grant the request or deny the request can be determined. Further, responsive to a determination to grant the request, the data packets that are part of the call can be transmitted to the second client device. The data packets that are part of the call may or may not continue to be transmitted to the first client device upon determining to grant the request (e.g., depending upon whether the call is transferred or a conference call is established).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
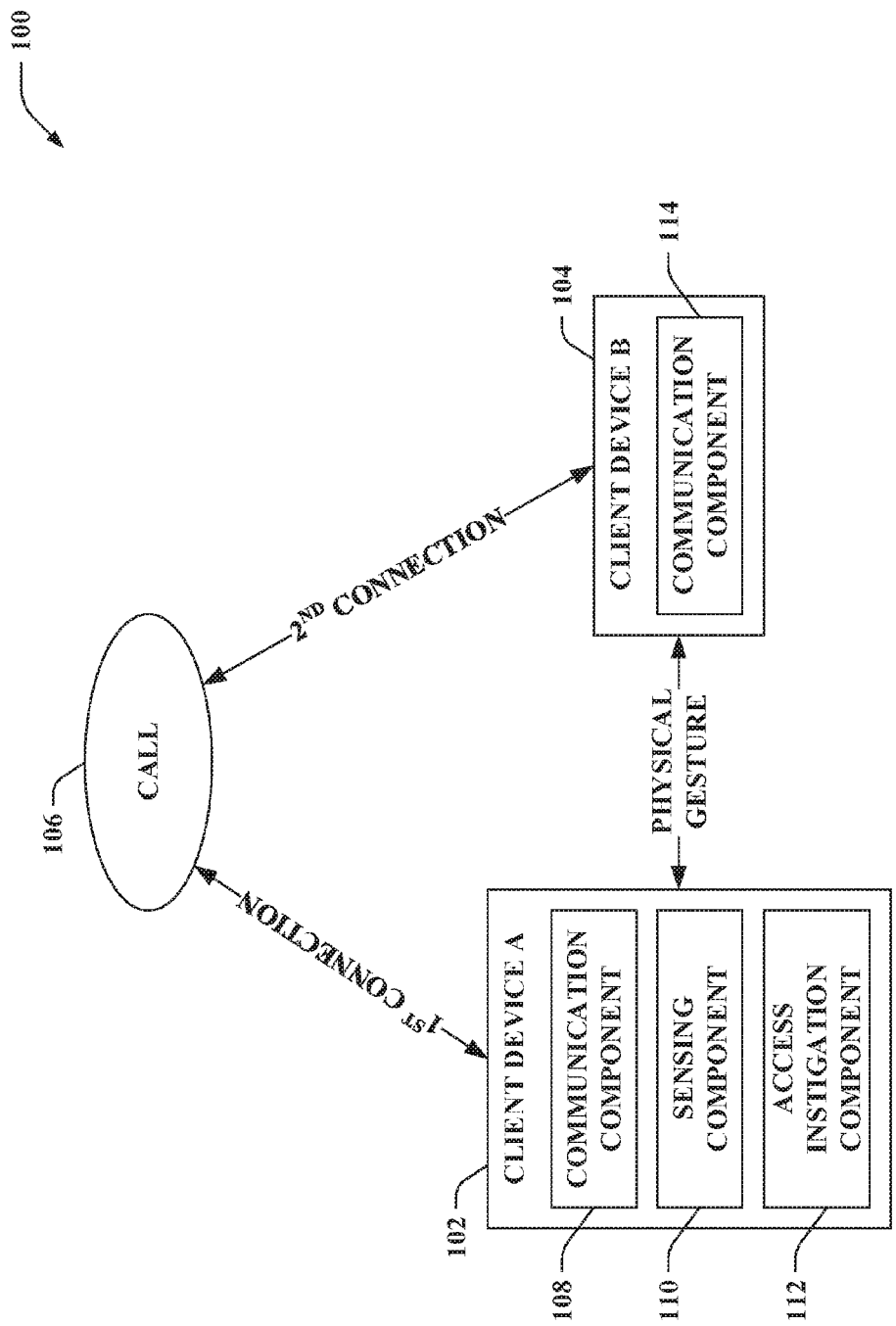
FIG. 1 illustrates a functional block diagram of an exemplary system that utilizes a physical gesture to initiate a call transfer or conference call between client devices.

Various technologies pertaining to utilizing a physical gesture to initiate a call transfer or conference call between client devices are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, a physical gesture between client devices can be detected; responsive to the detected physical gesture, a call to one of the client devices can be re-routed to the other client device. For example, a user may tap her mobile device to a conference phone in a conference room when leaving the conference room (e.g., to cause a conference call to be transferred from the conference phone to the mobile device, to join the conference call while the conference phone remains on the conference call, etc.). According to another example, a user may tap his car with his mobile device when exiting the car (e.g., to cause a call in which an integrated phone of the car is participating to transfer to the mobile device, to join the call while the integrated phone continues to participate in the call, etc.). Moreover, techniques set forth herein support group calling or transferring a call between client devices of friends; for instance, rather than passing a mobile device around a room, users can tap mobile devices together to transfer the call, form a conference call, etc. While tapping is described in the foregoing exemplary scenarios, it is contemplated that substantially any type of physical gesture is intended to fall within the scope of the hereto appended claims.

Referring now to the drawings, FIG. 1 illustrates a system 100 that utilizes a physical gesture to initiate a call transfer or conference call between client devices. The system 100 includes a client device A 102 and a client device B 104. Although not shown, it is to be appreciated that the system 100 can include more than two client devices, which can each be substantially similar to the client device A 102 and/or the client device B 104. Moreover, although not shown, it is contemplated that the system 100 can include a network over which the client device A 102 and/or the client device B 104 send and/or receive packets, signals, data, information, etc. pertaining to a call 106. It is to be appreciated that two or more parties (e.g., the client device A 102, the client device B 104, disparate client device(s) (not shown), etc.) can participate in the call 106.

The client device A 102 and the client device B 104 can be substantially any type of client device that can participate in the call 106. Examples of device types include, but are not limited to, mobile devices (e.g., smartphones, feature phones, other types of mobile phones, tablet computers, handheld computers, personal digital assistants (PDAs), portable gaming devices, wearable computers, etc.), personal computers, laptop computers, phones, conference phones, in-vehicle communications and infotainment systems (e.g., including integrated phones, etc.), televisions, gaming consoles, media centers, or the like.

The client device A 102 includes a communication component 108 that can send and/or receive packets, signals, data, information, etc. that are part of the call 106. As described in many of the examples set forth herein, the client device A 102 can participate in the call 106 via a first connection; thus, the communication component 108 can exchange packets, signals, data, information, etc. that are part of the call 106 with one or more disparate client devices (not shown) via the first connection. It is to be appreciated that the first connection can be established in substantially any manner. For example, the client device A 102 can initiate the call 106, which can cause the first connection to be established. By way of another example, a disparate client device (other than the client device A 102) can initiate the call 106 to the client device A 102, which can cause the first connection to be established. Pursuant to a further example, the call 106 can be ongoing when the client device A 102 joins (e.g., via transferring or conferencing as described herein); upon the client device A 102 joining the call 106, the first connection can be established.

In accordance with many of the exemplary scenarios described herein, the client device A 102 can participate in the call 106 via the first connection while the client device B 104 is not participating in the call 106 at a given time. Subsequent to the given time, a physical gesture can be detected. Responsive to detection of the physical gesture, a second connection can be established whereby the client device B 104 can participate in the call 106 (e.g., with or without the client device A 102 participating in the call 106 via the first connection to the call 106).

The client device A 102 can further include a sensing component 110 that can detect a physical gesture between the client device B 104 and the client device A 102. The sensing component 110 can detect substantially any type of physical gesture between the client device B 104 and the client device A 102. For example, the sensing component 110 can detect a tap between the client device B 104 and the client device A 102. According to another example, the sensing component 110 can detect a motion of the client device B 104 relative to the client device A 102 and/or a motion of the client device A 102 relative to the client device B 104. It is to be appreciated, however, that other types of physical gestures between the client device B 104 and the client device A 102 can be detected by the sensing component 110. Yet, a physical gesture between the client device B 104 and the client device A 102 as described herein differs from activation of a button of the client device B 104 and/or the client device A 102; for instance, a physical gesture as described herein is not intended to include activation of a touchscreen button (e.g., a button displayed on a touchscreen of the client device A 102 to transfer the call to the client device B 104, etc.).

It is contemplated that various forms of input can be analyzed by the sensing component 110 to detect the physical gesture between the client device B 104 and the client device A 102. For example, the sensing component 110 can employ near field communication (NFC) to detect a tap between the client device B 104 and the client device A 102. In accordance with another example, the sensing component 110 can detect the physical gesture based on strength of a signal received from the client device B 104. By way of another example, the sensing component 110 can utilize output of an accelerometer and/or a gyroscope included in the client device A 102 and/or the client device B 104 to detect the physical gesture. Moreover, the sensing component 110 can utilize location information based on external signals, such as Wi-Fi location, Global Positioning System (GPS), Assisted GPS (AGPS), etc., to detect the physical gesture. In accordance with yet another example, the sensing component 110 can employ output of a camera (e.g., motion sensor, etc.) to detect the physical gesture between the client device B 104 and the client device A 102. Further, it is to be appreciated that a combination of the foregoing examples can be employed by the sensing component 110 to detect the physical gesture between the client device B 104 and the client device A 102.

The client device A 102 can further include an access instigation component 112 that can initiate participation of the client device B 104 in the call 106 from the client device A 102 responsive to the detection of the physical gesture by the sensing component 110. The access instigation component 112 can cause the second connection to be established, for instance. According to an example, the access instigation component 112 can cause the call 106 to transfer from the client device A 102 to the client device B 104 responsive to the physical gesture being detected by the sensing component 110. Thus, the access instigation component 112 can initiate the participation of the client device B 104 in the call 106 by causing the call 106 to be transferred from the client device A 102 to the client device B 104. By way of another example, the access instigation component 112 can cause the client device B 104 to join the call 106 responsive to detection of the physical gesture by the sensing component 110. Following this example, the access instigation component 112 can initiate the participation of the client device B 104 in the call 106 by causing the client device B 104 to join the call 106 while the client device A 102 continues to participate in the call 106.

Moreover, the client device B 104 can include a communication component 114, which can be substantially similar to the communication component 108 of the client device A 102. Upon establishment of the second connection, the communication component 114 can exchange packets, signals, data, information, etc. that are part of the call 106 with one or more disparate client devices (not shown) via the second connection. Moreover, if the client device A 102 continues to participate in the call 106 after the client device B 104 joins, then the communication component 114 can additionally exchange packets, signals, data, information, etc. that are part of the call 106 with the client device A 102.

Although not shown, it is to be appreciated that the client device B 104 can be participating in a disparate call (e.g., a call other than the call 106) prior to establishment of the second connection for the call 106. Pursuant to this exemplary scenario, the call 106 and the disparate call can be combined upon establishment of the second connection for the call 106, for example. Alternatively, the client device B 104 can disconnect from the disparate call when establishing the second connection for the call 106.

According to various examples, different types of physical gestures can be detected by the sensing component 110. Different types of physical gestures between the client device A 102 and the client device B 104 can correspond to differing types of actions pertaining to the call 106. For example, a first physical gesture type can correspond to transferring the call 106 from the client device A 102 to the client device B 104 (referred to herein as a transfer action), whereas a second physical gesture type can correspond to joining the client device B 104 to the call 106 while the client device A 102 continues to participate in the call 106 (referred to herein as a conference action). Moreover, different types of physical gestures can differentiate between prompting or not prompting a user to confirm an action pertaining to the call. For instance, a particular physical gesture type can cause a prompt to be displayed on a display screen of the client device A 102 that solicits user input pertaining to whether to transfer the call 106 to client device B 104 (e.g., transfer can occur or not occur responsive to the user input) whereas a different physical gesture type can cause the call 106 to transfer to the client device B 104 without prompting for user confirmation. Similarly, differing physical gesture types can cause a prompt for user confirmation to be displayed or not for a conference action.

Moreover, the sensing component 110 can discern an identifier of the client device B 104 when the physical gesture between the client device B 104 and the client device A 102 is detected. For instance, the identifier can be utilized by the access instigation component 112 to initiate the participation of the client device B 104 in the call 106 from the client device A 102. According to an example, the identifier can be a phone identifier included in an NFC record; however, the claimed subject matter is not so limited.

While many of the examples set forth herein describe that the client device A 102 includes the sensing component 110 and the access instigation component 112, it is contemplated that the client device B 104 and/or a disparate client-side device can additionally or alternatively include the sensing component 110 and/or the access instigation component 112. For example, although not shown, the client device B 104 can include the sensing component 110 and/or the access instigation component 112. According to a further example, a disparate client-side device (e.g., a sensor such as a camera, a differing client device other than the client device A 102 or the client device B 104, etc.) separate from the client device A 102 and the client device B 104 can include the sensing component 110 and/or the access instigation component 112. Thus, the examples set forth herein (where the client device A 102 includes the sensing component 110 and the access instigation component 112) can be extended to scenarios where the client device B 104, the disparate client-side device separate from the client device A 102 and the client device B 104, or a combination thereof additionally or alternatively include the sensing component 110 and/or the access instigation component 112.

According to another example, it is contemplated that a server (or plurality of servers) can additionally or alternatively include the sensing component 110 and/or the access instigation component 112. It is to be appreciated the server can be a call server (e.g., a call server 1002 of FIG. 10) or a disparate server in a network. Following this example, the sensing component 110 of the server can collocate the client device A 102 and the client device B 104 within a particular geographic area (e.g., based on Wi-Fi, GPS, AGPS, etc.) and then detect the physical gesture based on data received from the client device A 102 and the client device B 104 (e.g., based on data from respective accelerometers of the client device A 102 and the client device B 104 indicative of taps within a period of time, etc.). Based upon the detected physical gesture, the access instigation component 112 can initiate the participation of the client device B 104 in the call. Accordingly, the examples set forth herein (where the client device A 102 includes the sensing component 110 and the access instigation component 112) can be extended to scenarios where the server additionally or alternatively includes the sensing component 110 and/or the access instigation component 112.

Figure 2:
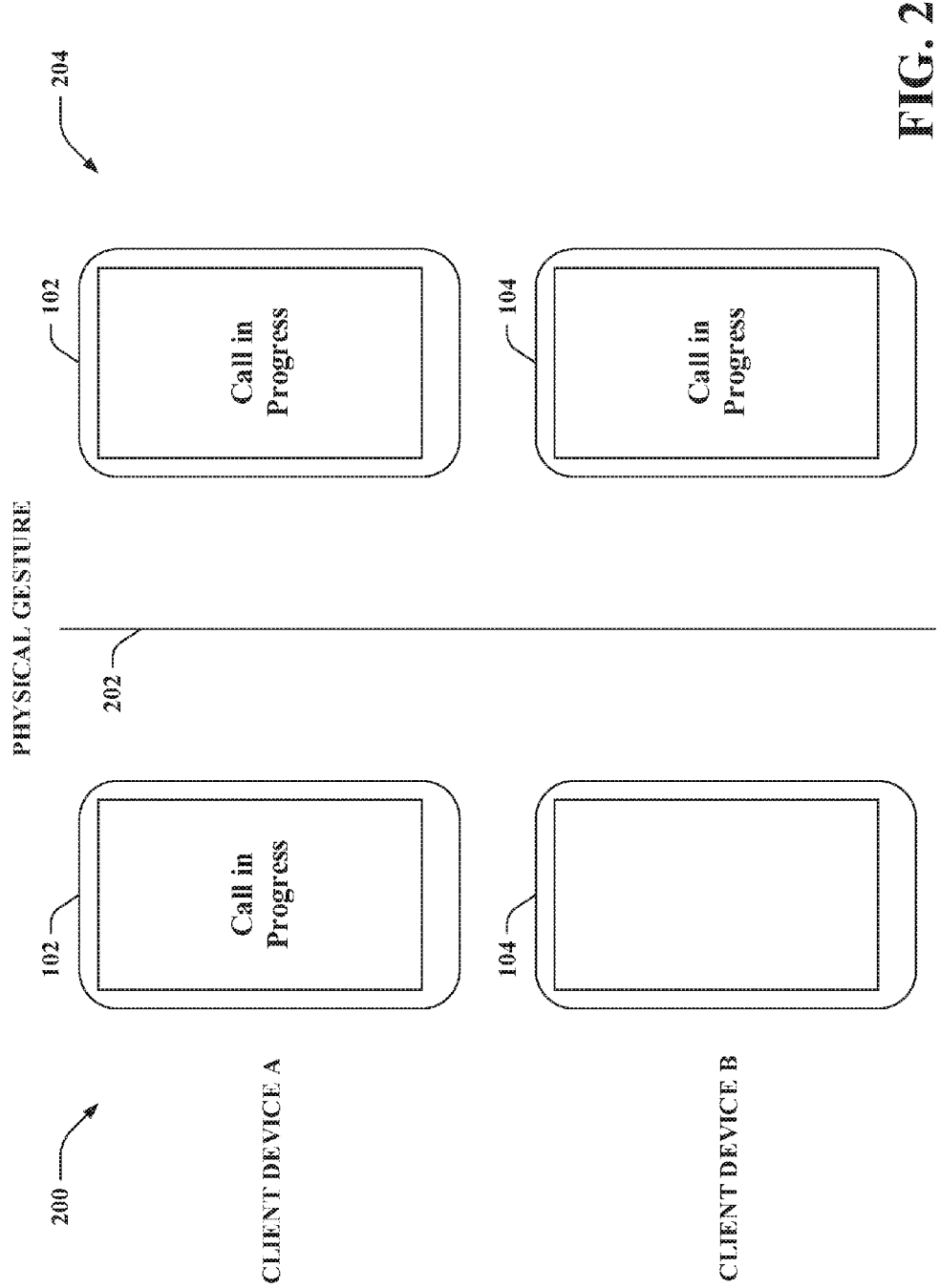
FIGS. 2-4 illustrate various exemplary scenarios where a physical gesture initiates a call transfer or a conference call between the client devices of FIG. 1
Figure 3:
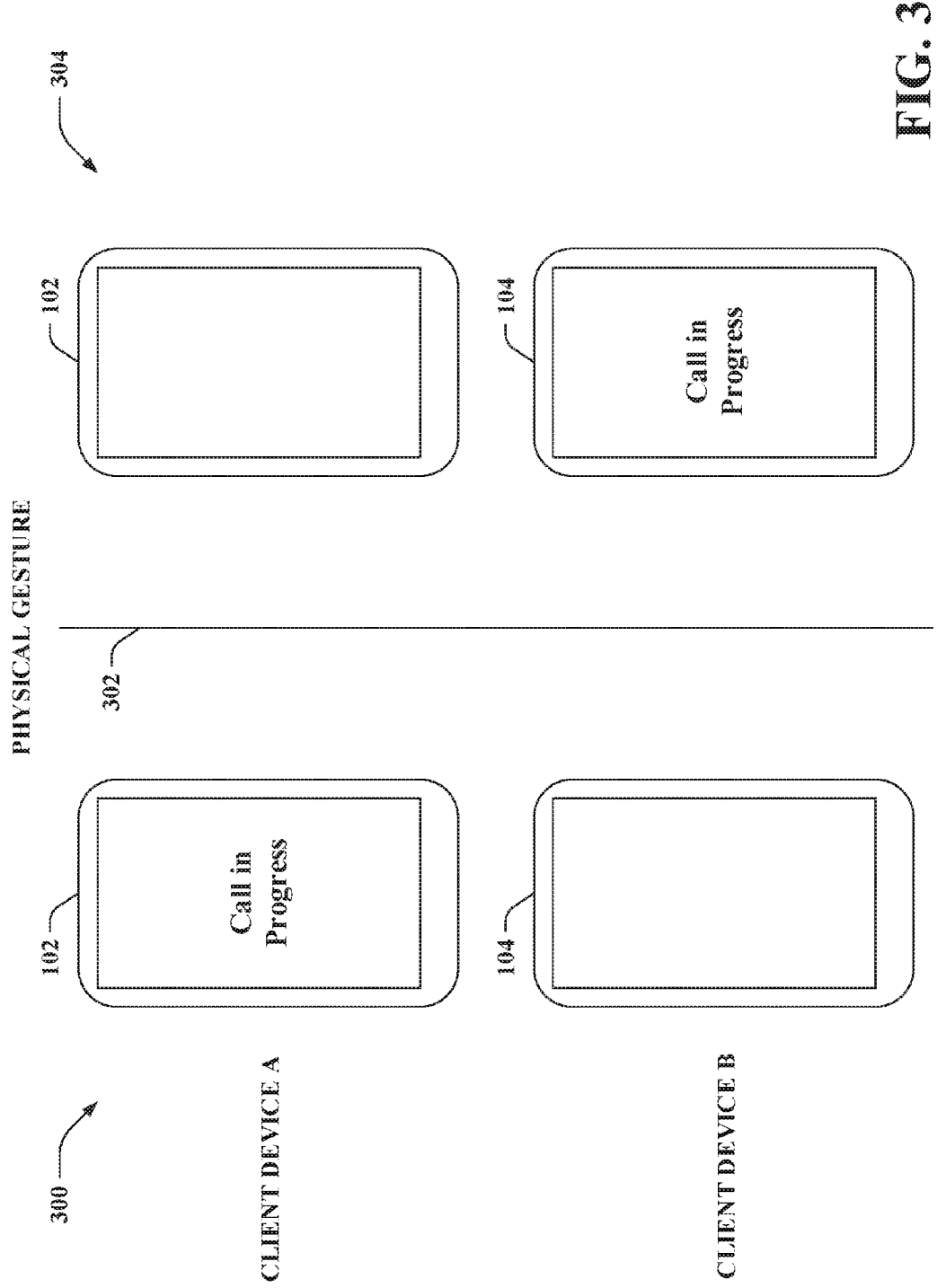
Figure 4:
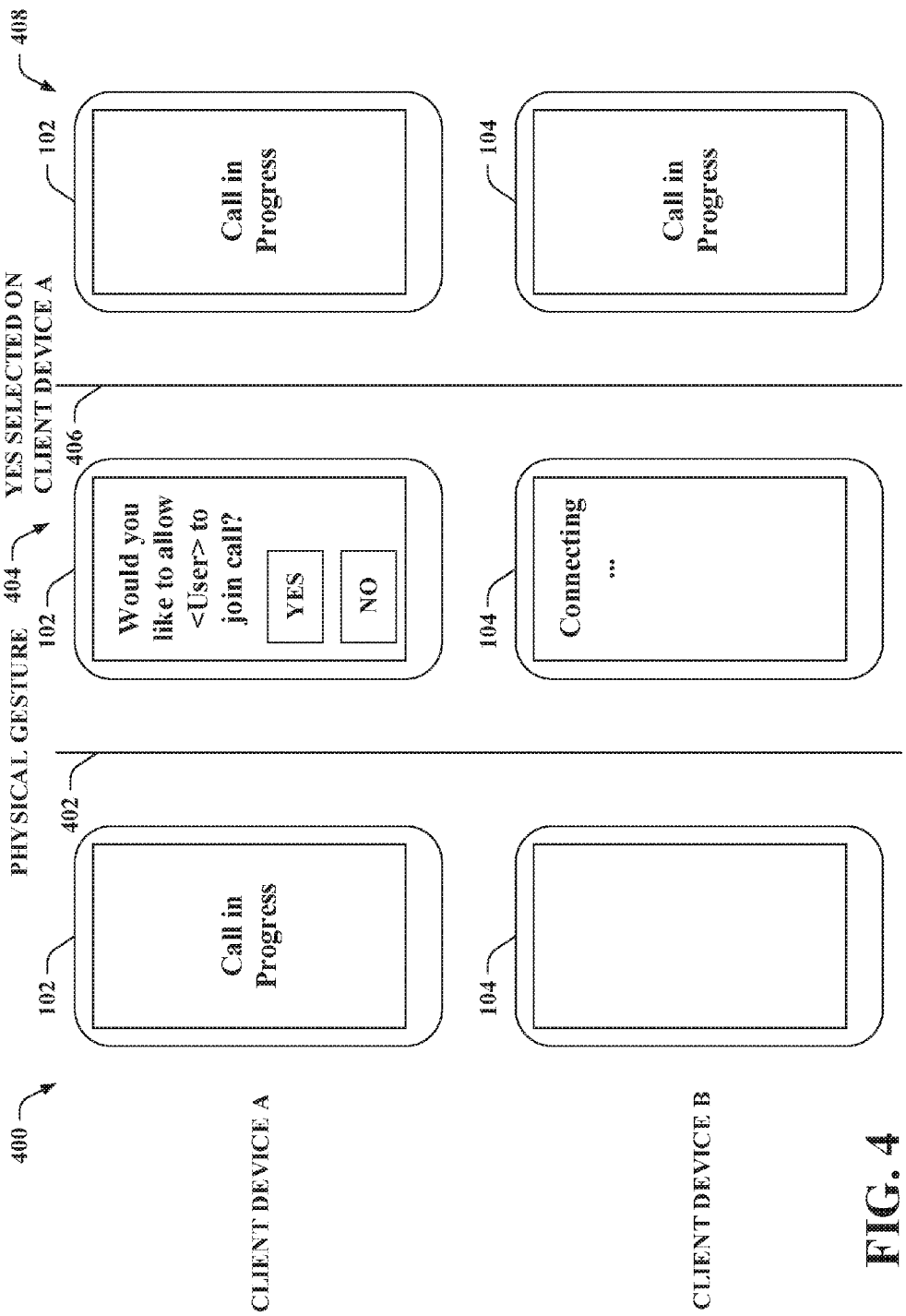

FIGS. 2-4 depict various exemplary scenarios where a physical gesture initiates a call transfer or a conference call between the client device A 102 and the client device B 104 of FIG. 1. FIGS. 2-4 show the client device A 102 and the client device B 104 as mobile devices; yet, as described herein, it is contemplated that the client device A 102 and/or the client device B 104 can be a disparate type of client device other than a mobile device.

With reference to FIG. 2, illustrated is an exemplary scenario where the client device B 104 is joined to a call responsive to a physical gesture. As shown at 200, the client device A 102 is participating in the call while the client device B 104 is not participating in the call. At 202, a physical gesture occurs between the client device A 102 and the client device B 104. At 204, both the client device A 102 and the client device B 104 are participating in the call subsequent to the physical gesture. Thus, in accordance with the exemplary scenario of FIG. 2, responsive to the physical gesture, the client device B 104 can join the call while the client device A 102 continues to participate in the call.

Turning to FIG. 3, illustrated is an exemplary scenario where a call is transferred between client devices. At 300, the client device A 102 is participating in the call while the client device B 104 is not participating in the call. Thereafter, at 302, a physical gesture between the client device A 102 and the client device B 104 occurs. At 304, responsive to the physical gesture, the call is transferred from the client device A 102 to the client device B 104. Accordingly, subsequent to the physical gesture, the client device B 104 participates in the call while the client device A 102 no longer participates in the call.

Turning to FIG. 4, illustrated is another exemplary scenario where the client device B 104 is joined to a call responsive to a physical gesture. At 400, the client device A 102 is participating in the call while the client device B 104 is not participating in the call. Responsive to a physical gesture between the client device A 102 and the client device B 104 at 402, the client device A 102 can display a prompt on a display screen at 404. The prompt can solicit user input concerning whether or not to allow the client device B 104 to join the call. Moreover, at 404, the client device B 104 can indicate that such device is connecting to the call. Responsive to YES being selected on the client device A 102 at 406, the client device A 102 and the client device B 104 both participate in the call at 408. Alternatively, if NO is selected on the client device A 102, then the attempt to join the client device B 104 can be discontinued (e.g., the client device A 102 can continue to participate in the call and the client device B 104 can continue to not participate in the call).

Further, it is contemplated that other types of user input can indicate YES or NO being selected on the client device A 102. For instance, the client device A 102 can detect whether or not to allow the client device B 104 to join responsive to a detected gesture of a user of the client device A 102, voice input of the user of the client device A 102, or the like.

Moreover, although not shown, it is contemplated that a "Join Call" dialog can be displayed on a display screen of the client device B 104 at 404. Such dialog can solicit user input concerning whether to join the call with the client device B 104. Similar types of user input as set forth above with respect to the client device A 102 can be utilized to indicate YES or NO being selected on the client device B 104.

Figure 5:
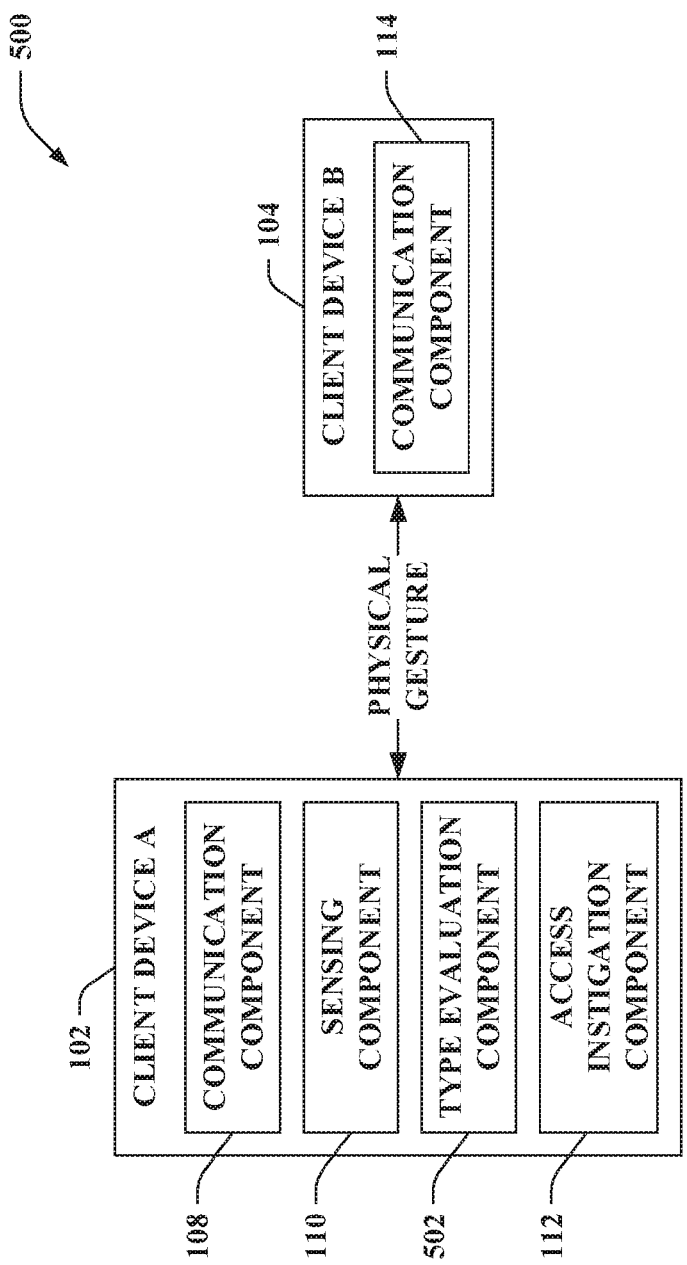
FIG. 5 illustrates a functional block diagram of an exemplary system that utilizes different types of physical gestures to identify different types of actions pertaining to a call.

Now turning to FIG. 5, illustrated is a system 500 that utilizes different types of physical gestures to identify different types of actions pertaining to a call. Again, the system 500 includes the client device A 102 and the client device B 104, where the client device A 102 is participating in the call and the client device B 104 is not participating in the call prior to detection of a physical gesture (e.g., by the sensing component 110).

The client device A 102 can further include a type evaluation component 502 that identifies a gesture type of the physical gesture detected by the sensing component 110 from a set of possible gesture types. The possible gesture types in the set correspond to differing respective actions pertaining to the call. Moreover, the access instigation component 112 can cause a particular action pertaining to the call corresponding to the gesture type detected by the type evaluation component 502 responsive to the detection of the physical gesture by the sensing component 110 and the identification of the gesture type by the type evaluation component 502.

According to an example, the physical gesture can be a tap; thus, the type evaluation component 502 can identify a tap type of the tap from a set of possible tap types. The possible tap types in the set can correspond to differing respective actions pertaining to the call. Further, the access instigation component 112 can cause a particular action pertaining to the call corresponding to the tap type responsive to the detection of the tap and the identification of the tap type. However, it is contemplated that other types of physical gestures other than taps are intended to fall within the scope of the hereto appended claims.

Again, reference is made to the example where the physical gesture is a tap. By way of illustration, a first possible tap type can correspond to a transfer action, where the call is transferred from the client device A 102 to the client device B 104. Moreover, a second possible tap type can correspond to a conference action, where the client device B 104 is joined to the call while the client device A 102 continues to participate in the call. However, other types of actions pertaining to the call are intended to fall within the scope of the hereto appended claims (e.g., automatic confirmation of a transfer action as shown in FIG. 3, automatic confirmation of a conference action as shown in FIG. 2, a transfer action that includes prompting for confirmation, a conference action that includes prompting for confirmation as shown in FIG. 4, etc.).

Continued reference is made to the exemplary scenario where the physical gesture is a tap. The type evaluation component 502 can identify the tap type of the tap as a function of a location on a housing of the client device A 102 at which the tap is detected (e.g., tap point, etc.), an orientation of the client device B 104 with respect to the client device A 102 during the tap, a time duration of the tap (e.g., tap and hold, etc.), a number of occurrences of the tap (e.g., single tap, double tap, etc.), a combination thereof, and so forth. Thus, tap actions can have multiple definitions depending on context or policy. For instance, a double tap may be utilized to transfer a call from the client device A 102 to the client device B 104 (e.g., a double tap can correspond to a transfer action), whereas a single tap can be utilized to join the client device B 104 to the call while the client device A 102 continues to participate in the call (e.g., a single tap can correspond to a conference action). By way of another example, a double tap can be an automatic confirmation of acceptance for a transfer action, whereas a single tap can correspond to a transfer action that includes prompting for confirmation from a user of the client device A 102 (e.g., presenting a selectable button on a display screen of the client device A 102 to accept or reject transferring the call to the client device B 104).

Figure 6:
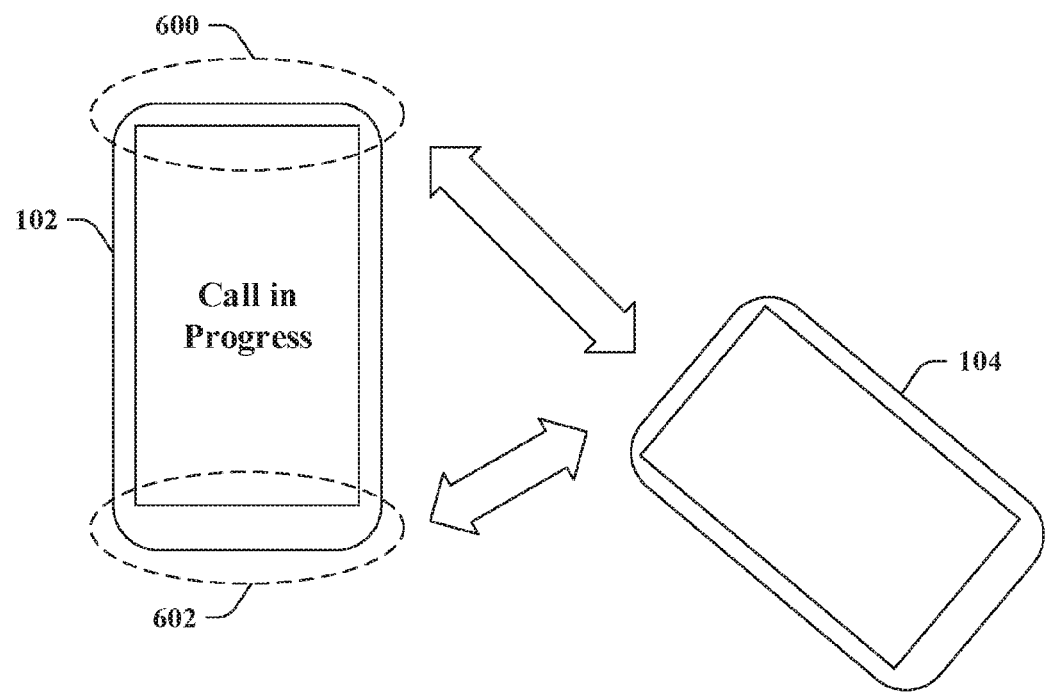
FIGS. 6-8 illustrate various examples of different types of taps between client devices.
Figure 7:
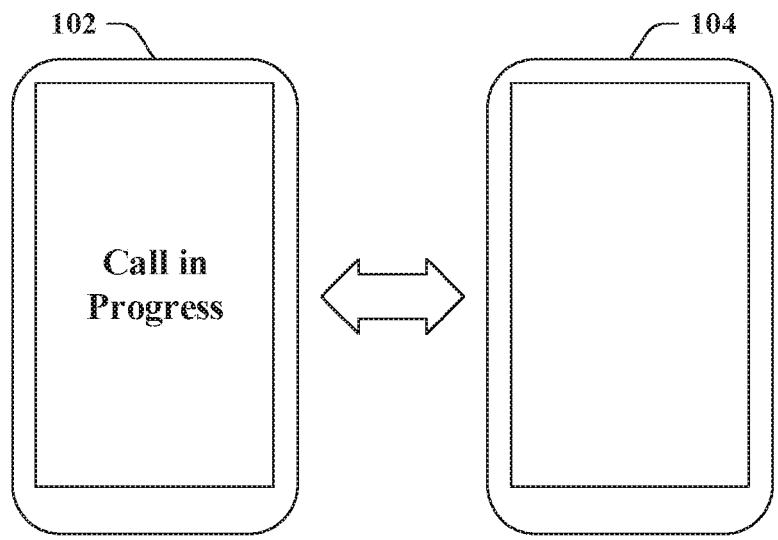
Figure 8:
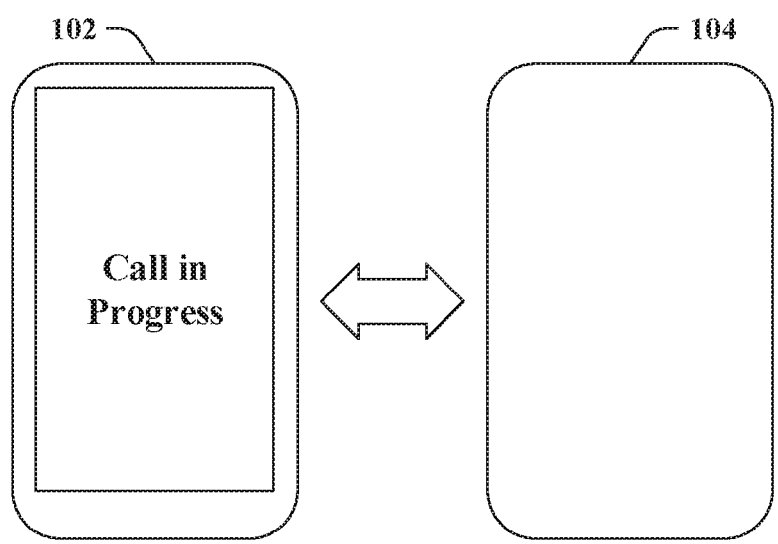

FIGS. 6-8 illustrate various examples of different types of taps between the client device A 102 and the client device B 104. Again, the client device A 102 and the client device B 104 are depicted as mobile devices; yet, as described herein, it is to be appreciated that the client device A 102 and/or the client device B 104 can be a disparate type of client device other than a mobile device.

Turning to FIG. 6, illustrated is an example where a tap type is determined based upon a location of a tap on a housing of the client device A 102. A tap between the client device A 102 and the client device B 104 at a location 600 on the housing of the client device A 102 can correspond to a first tap type. Moreover, a tap between the client device A 102 and the client device B 104 at a location 602 on the housing of the client device A 102 can correspond to a second tap type. Thus, the client device A 102 can include different tap points (e.g., the location 600 versus the location 602) such that a tap at the location 600 on the housing of the client device A 102 can cause a first action pertaining to a call and a tap at the location 602 on the housing of the client device B 104 can cause a differing second action pertaining to the call.

The client device A 102 can employ various techniques to detect whether a tap is at the location 600 or the location 602. For instance, the client device A 102 can include two NFC chips (e.g., one positioned at or near the location 600 and the other positioned at or near the location 602). By way of another example, the client device A 102 can determine whether the tap is at the location 600 or the location 602 based upon signal strength (e.g., an NFC chip can be positioned at or near either the location 600 or the location 602). However, it is to be appreciated that other techniques for determining the location of the tap on the housing of the client device A 102 are intended to fall within the scope of the hereto appended claims.

While FIG. 6 illustrates two locations on the housing of the client device A 102 being utilized to distinguish between tap types, it is to be appreciated that substantially any number of locations on the housing of the client device A 102 can be employed. Moreover, it is to be appreciated that the locations need not be at a top and a bottom of the client device A 102; rather, substantially any other locations on the housing can be employed (e.g., front versus back, side versus side, first corner versus second corner, etc.).

Moreover, it is to be appreciated that locations on the housing of the client device B 104 can additionally or alternatively be associated with differing tap types. According to an example, a tap type can determined based upon a location of a tap on the housing of the client device B 104. By way of another example, a combination of a location on the housing of the client device A 102 and a location on the housing of the client device B 104 of a tap can correspond to a particular tap type.

It is further contemplated that the example set forth in FIG. 6 can be extended to a scenario where the client device A 102 and the client device B 104 are moved relative to each other within proximity (e.g., without tapping). For instance, the client device B 104 can move within proximity of the location 600 or the location 602; thus, relative movement towards the location 600 can be distinguished from relative movement towards the location 602, which can enable determining a corresponding gesture type of the relative movement.

FIGS. 7-8 illustrate an example where a tap type is determined based upon an orientation of the client device A 102 relative to the client device B 104 during the physical gesture (e.g., the tap). As illustrated in FIG. 7, the client device A 102 and the client device B 104 can face a common direction when tapped together. For instance, a back of the client device A 102 can be tapped to a front of the client device B 104. In contrast, as illustrated in FIG. 8, the client device A 102 and the client device B 104 can be oriented in opposite directions. For instance, as shown in FIG. 8, a back of the client device A 102 can be tapped to a back of the client device B 104. According to another example, a front of the client device A 102 can be tapped to a front of the client device B 104. Hence, the relative orientations of the client device A 102 and the client device B 104 in the examples of FIGS. 7-8 correspond to differing tap types.

Pursuant to another example, it is contemplated that the physical gesture can be motion of the client device A 102 and the client device B 104 relative to each other (e.g., without tapping). Again, the orientations depicted in FIGS. 7-8 can pertain to different gesture types when the client device A 102 and the client device B 104 move within proximity.

Figure 9:
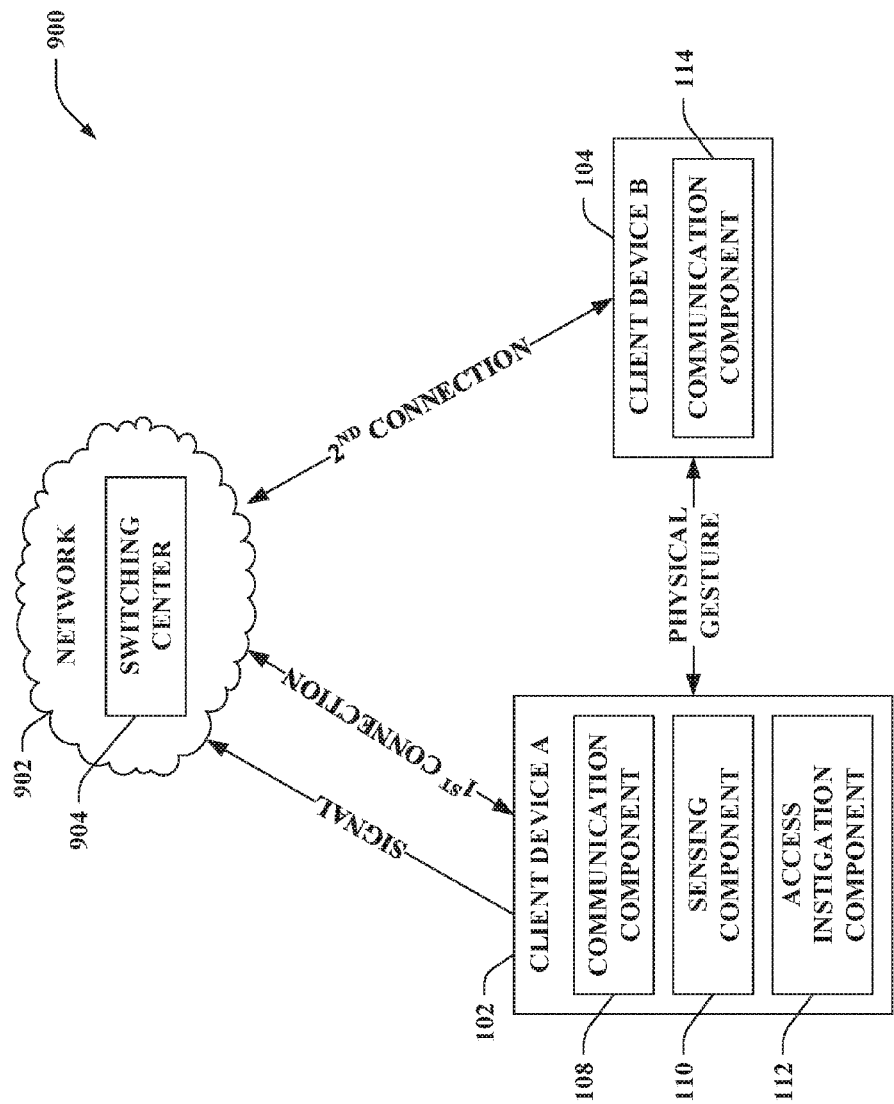
FIG. 9 illustrates a functional block diagram of an exemplary system that routes a call to a client device responsive to a physical gesture between the client device and a differing client device.

With reference to FIG. 9, illustrated is a system 900 that routes a call to the client device B 104 responsive to a physical gesture between the client device B 104 and the client device A 102. The system 900 includes a network 902, which further includes a switching center 904. For example, the network 902 can include the public switched telephone network (PSTN) (or a portion thereof), and the switching center 904 can be a telephone switch, the network 902 can be a local network (or a portion thereof) and the switching center 904 can be a private branch exchange (PBX), a combination thereof, or the like.

Following the ongoing example set forth herein, the client device A 102 participates in the call and the client device B 104 does not participate in the call prior to detection of a physical gesture by the sensing component 110. The access instigation component 112 of the client device A 102 can initiate the participation of the client device B 104 in the call by transmitting a signal over the network 902 to the switching center 904 from the client device A 102. Thus, the signal can be sent by the access instigation component 112 to the switching center 904 through the telephony system (e.g., the network 902) to request transfer to the client device B 104.

Moreover, the signal can cause the switching center 904 to route the call to the client device B 104. In response to receipt of the signal, the switching center 904 (or a disparate node of the network 902) can cause the client device B 104 to join the call, ring, or the like. According to an example, the switching center 904 can route the call to the client device B 104 while also routing the call to the client device A 102 responsive to receipt of the signal. According to another example, the switching center 904 can discontinue routing the call to the client device A 102 while routing the call to the client device B 104 responsive to receipt of the signal.

Figure 10:
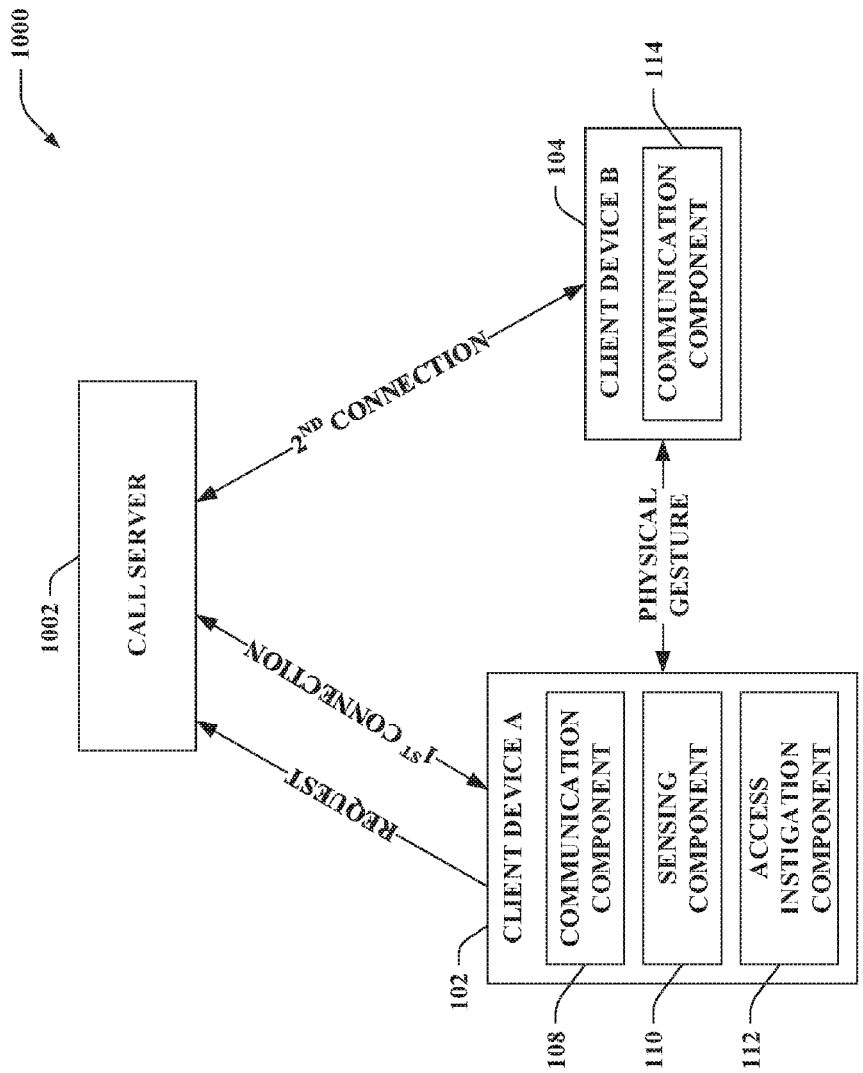
FIG. 10 illustrates a functional block diagram of an exemplary system that employs physical gestures to initiate transferring calls between client devices.

Turning to FIG. 10, illustrated is another exemplary system 1000 that employs physical gestures to initiate transferring calls between client devices. The system 1000 includes the client device A 102 and the client device B 104. Moreover, the system 1000 includes a call server 1002 (e.g., a Voice over Internet Protocol (VoIP) server). It is contemplated that the call server 1002 can be a cloud based communication device, a communication device (e.g., router, gateway, etc.) on a local network, or the like.

In the example of FIG. 10, the sensing component 110 can detect a physical gesture (e.g., tap, disparate type of physical gesture, etc.) between the client device A 102 and the client device B 104. Responsive to detection of the physical gesture, the access instigation component 112 can initiate the participation of the client device B 104 in the call by transmitting a request to the call server 1002 from the client device A 102. The request can cause the call server 1002 to route the call to the client device B 104. For instance, the request can specify an IP address of the client device B 104 to which the call is requested to be routed. Responsive to receipt of the request, the call server 1002 can route the call to the client device B 104 (e.g., while also routing the call to the client device A 102 or without routing the call to the client device A 102).

Figure 11:
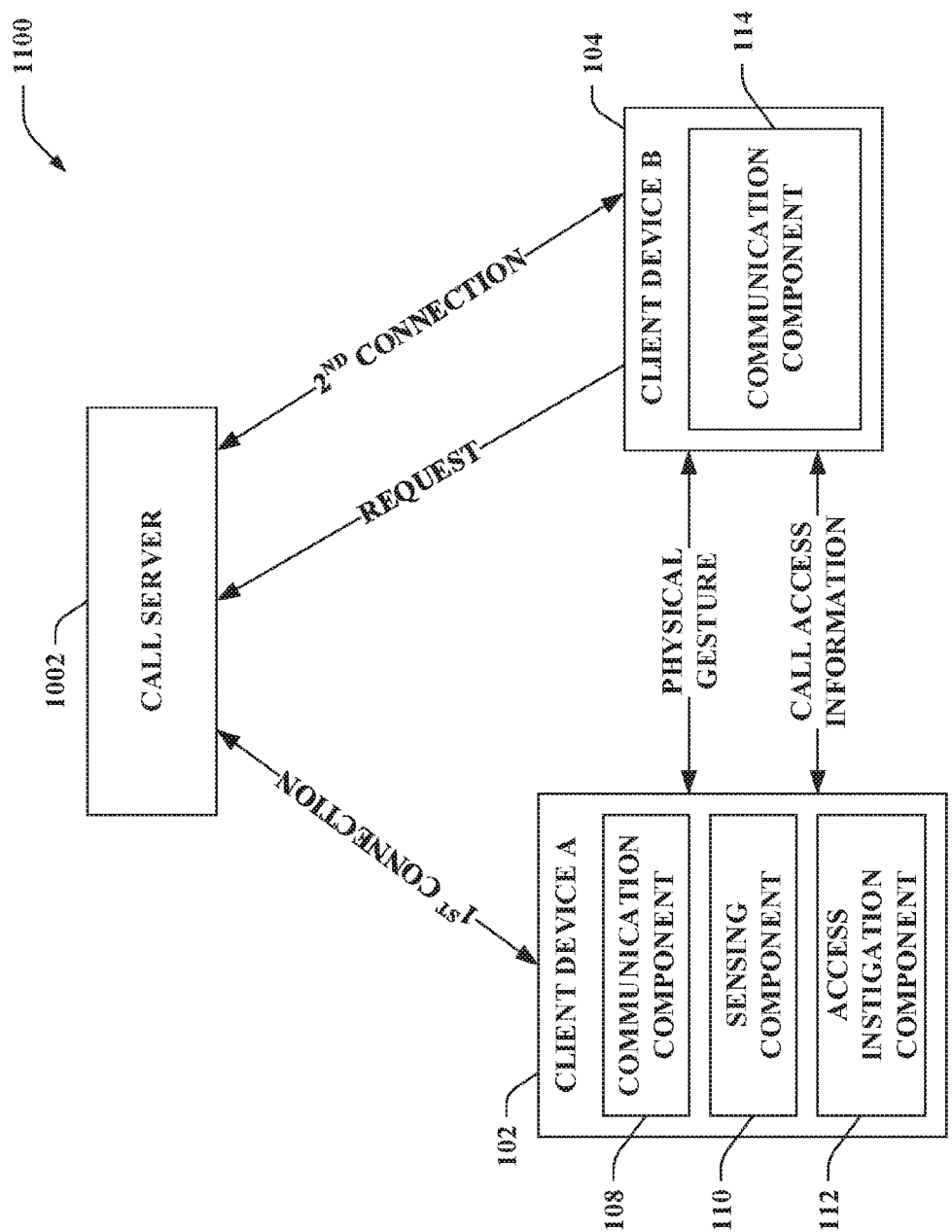
FIG. 11 illustrates a functional block diagram of an exemplary system that transfers calls responsive to detected physical gestures between client devices.

With reference to FIG. 11, illustrated is another exemplary system 1100 that transfers calls responsive to detected physical gestures between client devices. Again, the system 1100 includes the client device A 102, the client device B 104, and the call server 1002. In the example of FIG. 11, the sensing component 110 of the client device A 102 can detect the physical gesture between the client device B 104 and the client device A 102. Moreover, responsive to the detection of the physical gesture by the sensing component 110, the access instigation component 112 can initiate participation of the client device B 104 in the call from the client device A 102 by transmitting call access information to the client device B 104. The client device B 104 can receive the call access information and can utilize the call access information to connect to the call. For instance, the client device B 104 can send a request to the call server 102, where the request can cause the call server 1002 to route the call to the client device B 104.

According to the example set forth in FIG. 11, the client device A 102 can transmit the call access information over NFC, Wi-Fi, Bluetooth, etc. to the client device B 104. The call access information, for instance, can include a link or other information informing the client device B 104 how to join the call. According to another example, the call access information can enable the client device B 104 to automatically join the call; yet, the claimed subject matter is not so limited. According to another example, it is contemplated that the call access information can be a link for a teleconference from an invitation. According to another example, the call access information can be dynamically created by the access instigation component 112 on the client device A 102 and can be utilized by the client device B 104 to join the call. Further, it is contemplated that the call access information can be dynamically generated by the call server 1002, and thereafter, provided to the client device B 104 (e.g., directly from the call server 1002 to the client device B 104, via the client device A 102, etc.).

According to various embodiments, the physical gesture need not contact something on the other client device (e.g., the client device B 104 need not contact the client device A 102). For instance, the client device B 104 can be tapped on a table which is registered as a hard stop by an engine included in the client device B 104, which can determine that the client device B 104 would like to join the call 106. The client device B 104 can then connect to the call server 1002 and attempt to join the call in progress (e.g., by sending the request).

Figure 12:
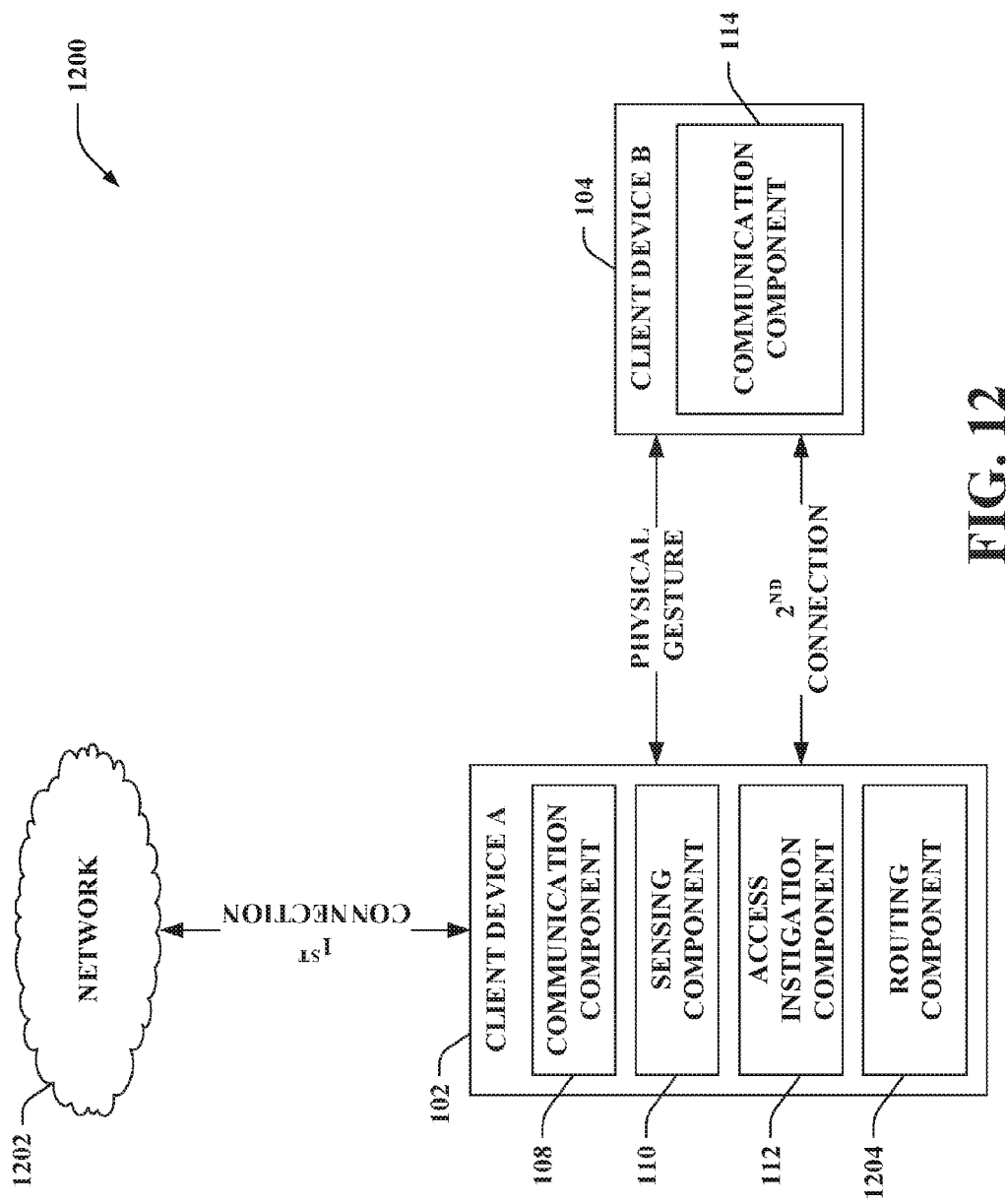
FIG. 12 illustrates a functional block diagram of an exemplary system that sources a call from a first client device to a second client device responsive to detection of a physical gesture.

With reference to FIG. 12, illustrated is a system 1200 that sources a call from the client device A 102 to the client device B 104 responsive to detection of a physical gesture. Again, the client device A 102 participates in the call via the first connection. For instance, the client device A 102 can exchange packets, signals, data, information, etc. pertaining to the call over a network 1202.

Moreover, the sensing component 110 can detect the physical gesture between the client device B 104 and the client device A 102 (e.g., while the client device A 102 participates in the call and while the client device B 104 is not participating in the call). The client device A 102 further includes a routing component 1204 that can source the call to the client device B 104. Accordingly, the access instigation component 112 can cause the client device B 104 to participate in the call responsive to detection of the physical gesture by enabling the routing component 1204 to send and/or receive packets, signals, data, information, etc. associated with the call to the client device B 104 (e.g., the routing component 1204 can source the call to the client device B 104 from the client device A 102). The routing component 1204 can source the call over Wi-Fi, Bluetooth, or the like. For instance, following the example of FIG. 12, the client device A 102 can act as a VoIP server to the client device B 104; yet, the claimed subject matter is not so limited.

Figure 13:
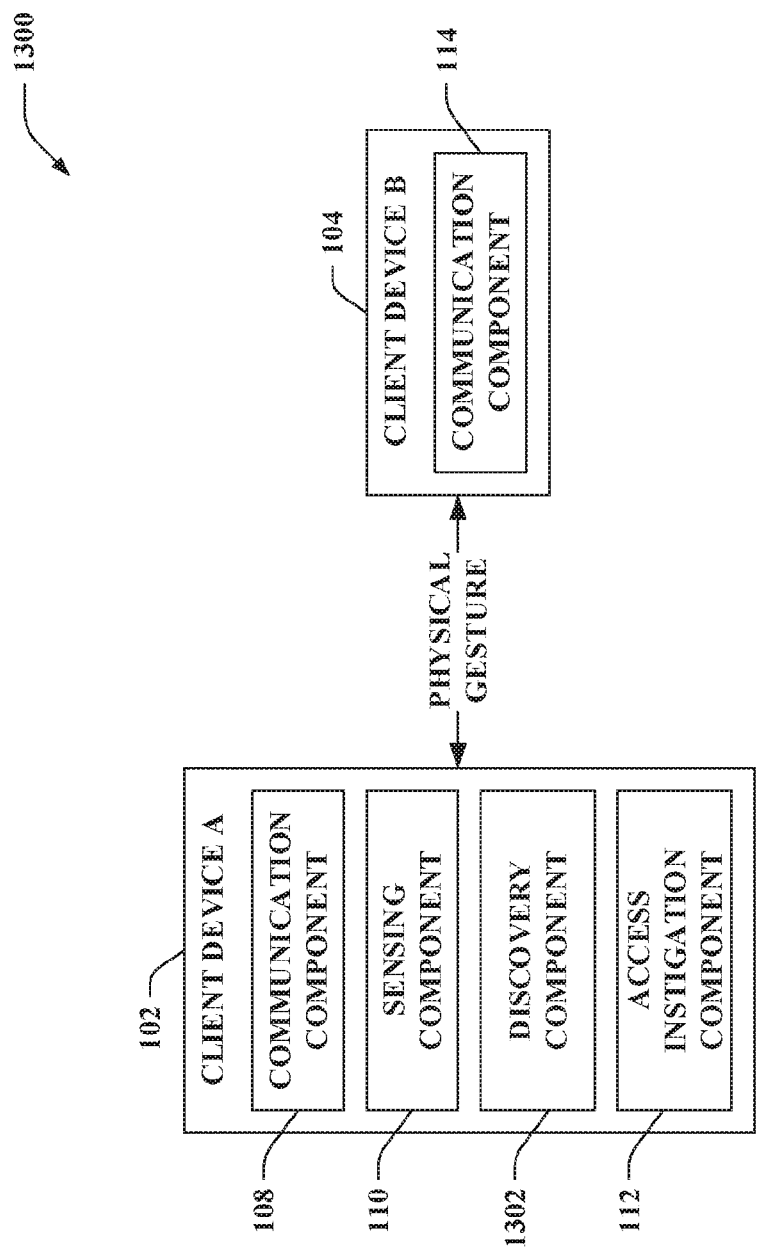
FIG. 13 illustrates a functional block diagram of an exemplary system that transfers calls responsive to a physical gesture based upon capabilities of client devices.

Turning now to FIG. 13, illustrated is a system 1300 that transfers calls responsive to a physical gesture based upon capabilities of the client device A 102 and the client device B 104. Again, the client device A 102 can include the communication component 108, the sensing component 110, and the access instigation component 112. Moreover, the client device A 102 can include a discovery component 1302 that can discover capabilities of the client device B 104. The discovery component 1302 can further select a communication technique based upon the capabilities of the client device B 104. Further, the access instigation component 112 can initiate the participation of the client device B 104 in the call from the client device A 102 utilizing the connection technique selected based upon the capabilities of the client device B 104 identified by the discovery component 1302.

Figure 14:
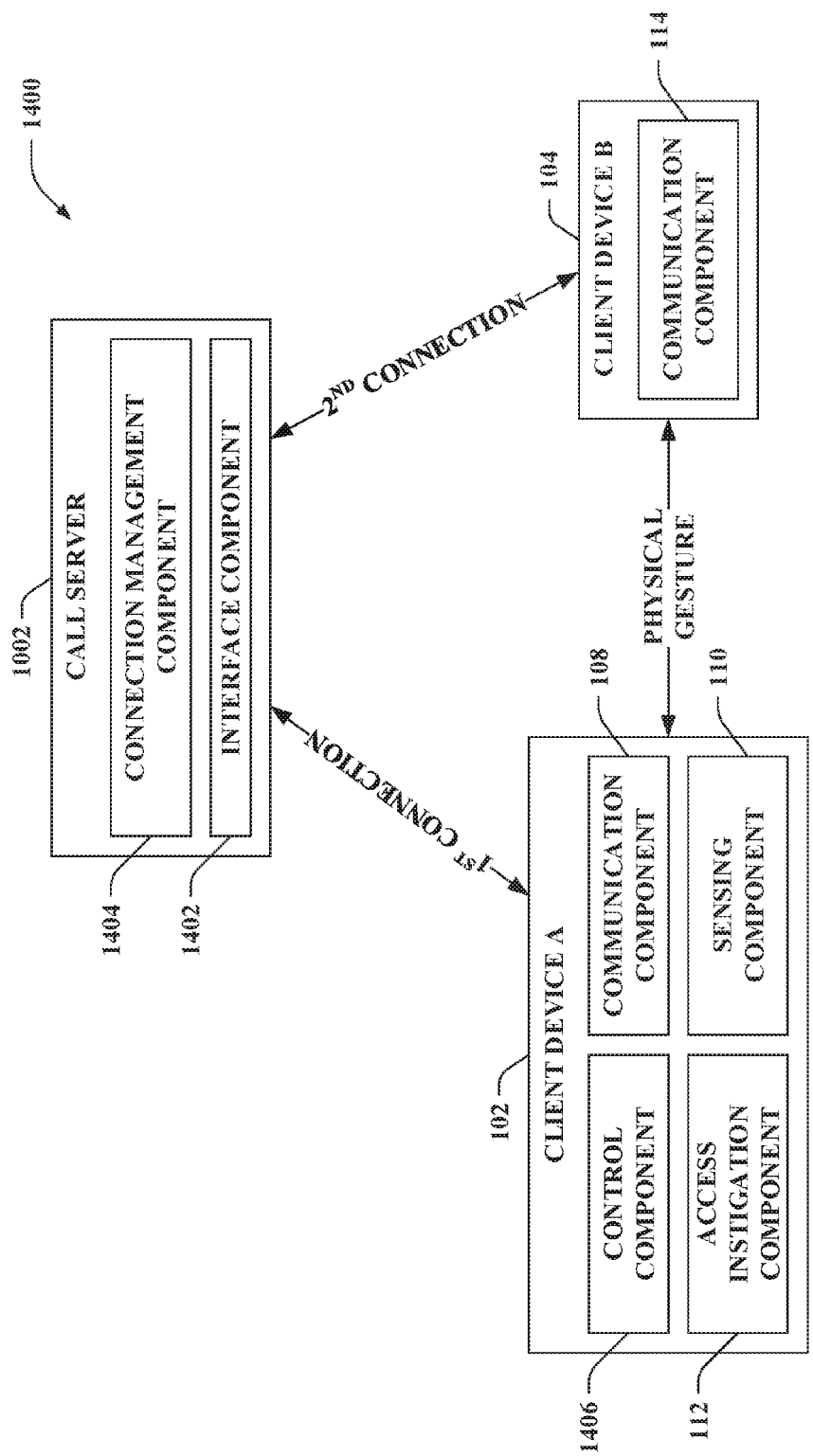
FIG. 14 illustrates a functional block diagram of an exemplary system that routes a call to client device(s) from a call server.

Now turning to FIG. 14, illustrated is a system 1400 that routes a call to client device(s) from the call server 1002. The system 1400 includes the client device A 102 and the client device B 104. The call server 1002 can include an interface component 1402 that can transmit data packets that are part of the call to the client device A 102. Moreover, the interface component 1402 can receive a request to route the data packets that are part of the call to the client device B 104. The request can be received from the client device A 102 and/or the client device B 104 responsive to a detected physical gesture between the client device A 102 and the client device B 104. Moreover, the data packets that are part of the call are not routed to the client device B 104 prior to receipt of the request by the interface component 1402.

The call server 1002 further includes a connection management component 1404 that can determine whether to grant the request or deny the request. For instance, the connection management component 1404 can grant or deny the request based upon information included in the request (e.g., specification of a type of physical gesture detected between the client device A 102 and the client device B 104, identity of the client device A 102, identity of the client device B 104, etc.). Additionally or alternatively, the connection management component 1404 can determine whether to grant the request or deny the request utilizing a predefined policy based upon conditions of the call, the client device A 102, and/or the client device B 104. Moreover, the connection management component 1404 can evaluate whether to grant the request or deny the request based upon permissions (e.g., an originator of a meeting can specify that an invitee can pick up the meeting on his client device from a conference phone whereas someone not invited is unable to pick up the meeting, etc.).

The client device A 102 can further include a control component 1406 that can set the predefined policy for granting or denying requests. Although not shown, it is to be appreciated that the control component 1406 can be included in the client device B 104, or substantially any other device (not shown) in the system 1400. The control component 1406 can set the predefined policy to grant or deny requests based on conditions such as, location, type of device, identity of device, whether the device is domain joined, etc. For instance, the control component 1406 can set the predefined policy generally for the client device A 102, for a given meeting (e.g., setting on a meeting invitation, etc.), or the like.

Moreover, the connection management component 1404 of the call server 1002 can determine whether to continue to transmit the data packets that are part of the call to the client device A 102 or discontinue transmission of the data packets that are part of the call to the client device A 102 based at least in part upon request. Responsive to the determination to grant the request to transmit the data packets to the client device B 104, the interface component 1402 can then either continue to transmit the data packets that are part of the call to the client device A 102 or discontinue the transmission of the data packets that are part of the call to the client device A 102. Again, the control component 1406 can set the predefined policy, which can specify whether to continue or discontinue transmission of the data packets that are part of the call to the client device A 102, based on conditions such as, location, type of device, identity of device, whether the device is domain joined, etc; further, the connection management component 1404 can determine whether to continue or discontinue such transmission based upon the predefined policy.

Figure 15:
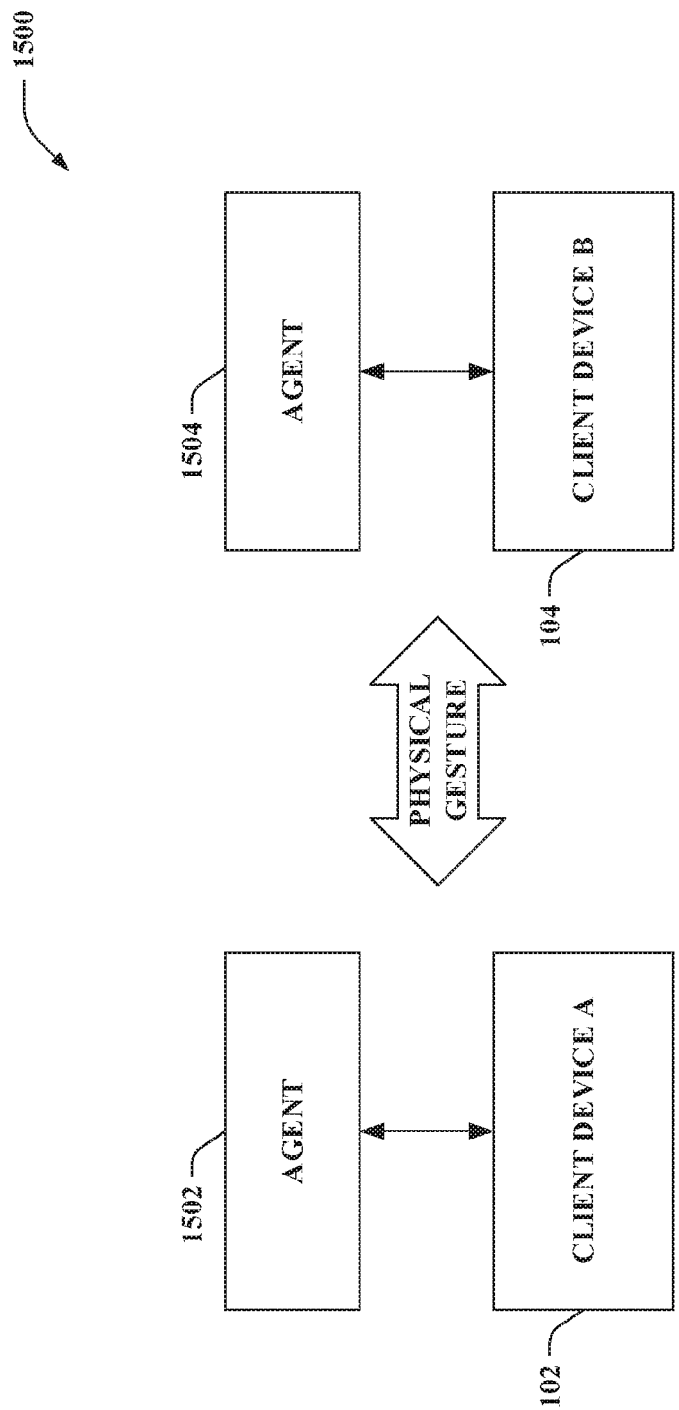
FIG. 15 illustrates a functional block diagram of an exemplary system that employs agents with the client devices.

Turning to FIG. 15, illustrated is a system 1500 that employs agents with the client devices (e.g., agents of client devices that perform the communications of a call). According to the example shown, the client device A 102 can be associated with an agent 1502 and the client device B 104 can be associated with an agent 1504. It is to be appreciated that the client device A 102 can be associated with substantially any number of agents substantially similar to the agent 1502 and/or the client device B 104 can be associated with substantially any number of agents substantially similar to the agent 1504.

Substantially any type of agent of a client device is intended to fall within the scope of the hereto appended claims. Examples of types of agents include devices coupled with a client device (e.g., a Bluetooth earpiece, etc.), a display screen of a client device, a keyboard of a client device, a sensor associated with a client device (e.g., a camera, etc.), a table on which a conference phone is situated, a portion of a car (e.g., dashboard, door, steering wheel, etc.) where the car includes an integrated phone, or the like.

The examples described herein can be extended to scenarios that include agents (e.g., the agent 1502, the agent 1504, etc.). For instance, a physical gesture (e.g., tapping) can be utilized to enable or disable agents of client devices (e.g., Bluetooth earpieces, etc.). Accordingly, a physical gesture can be detected between the agent 1502 (of the first client device A 102) and the client device B 104. According to another example, a physical gesture can be detected between the agent 1504 (of the client device B 104) and the client device A 102. By way of yet another example, a physical gesture can be detected between the agent 1502 (of the client device A 102) and the agent 1504 (of the client device B 104).

Figure 16:
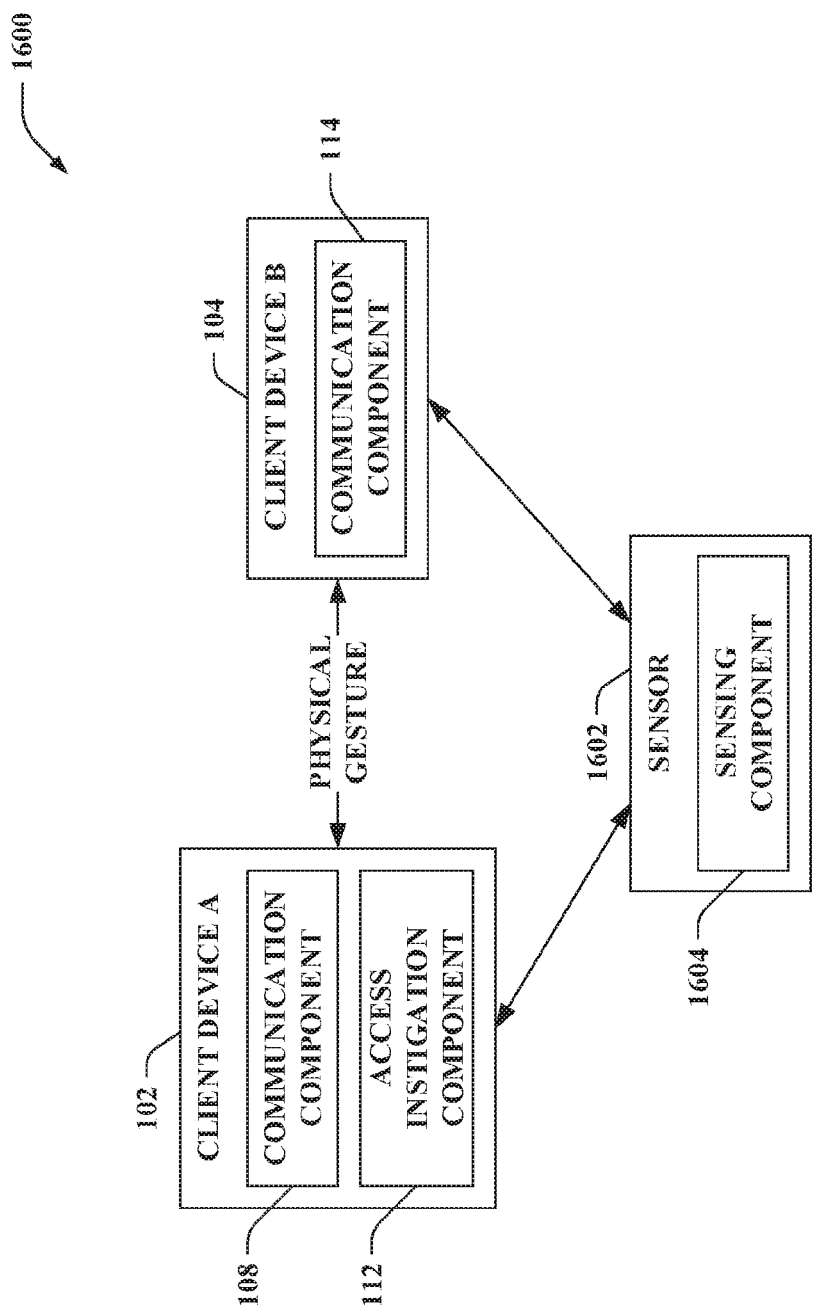
FIG. 16 illustrates a functional block diagram of an exemplary system that employs a sensor to detect a physical gesture between client devices.

Turning to FIG. 16, illustrated is a system 1600 that employs a sensor 1602 (e.g., a disparate client-side device) to detect the physical gesture between the client device A 102 and the client device B 104. The sensor 1602 can include a sensing component 1604, which can be substantially similar to the sensing component 110 of FIG. 1. It is to be appreciated that the sensor 1602 can be coupled with the client device A 102 and/or the client device B 104.

For example, the sensor 1602 can be a camera. Following this example, the sensor 1602 can be a camera in a conference room, for instance. Accordingly, the camera can detect a physical gesture of the client device B 104, which can be signaled to the client device A 102. Thereafter, the access instigation component 112 of the client device A 102 can initiate participation of the client device B 104 in the call from the client device A 102 responsive to the detection of the physical gesture. Yet, it is contemplated that the claimed subject matter is not limited to the foregoing. Pursuant to another example, it is contemplated that the sensor 1602 can include the access instigation component 112; yet, the claimed subject matter is not so limited.

Various exemplary scenarios can be implemented utilizing the techniques described herein. It is to be appreciated that the following scenarios are presented for illustration purposes, and the claimed subject matter is not limited to the following scenarios.

According to an exemplary scenario, a user can be in a conference call in a conference room. The conversation can be ongoing when the room booking ends. Accordingly, the user can tap his mobile device to a conference phone in the conference room. When the user taps his mobile device to the conference phone, a screen can be displayed (e.g., on a display screen associated with the conference phone, on a display screen of the mobile device of the user, etc.) with a message that offers an option to take the conference call, join the conference call, or cancel. The user can take the conference call and the conference phone in the conference room can discontinue participating in the conference call.

The user can thereafter continue participating in the conference call in the hall with his mobile device, while a next booking can use the conference room.

Pursuant to another exemplary scenario, and again referring to the above conference room scenario where the user is participating in the conference call in the hall, another attendee from the conference room who desires to join the continuing conference call can tap her mobile device to the mobile device of the initial user currently participating in the conference call. The initial user may or may not have to approve the inclusion of the subsequent user to the conference call. Thus, two attendees of the conference call can continue to participate in the conference call (e.g., while walking separate directions, etc.).

Moreover, one of the users from the foregoing conference room scenario can return to his or her office. Following this exemplary scenario, the mobile device participating in the conference call can be tapped to a phone (e.g., VoIP phone) in his or her office, and an accept button on the office phone can be selected. Thereafter, the user can disconnect the mobile device from the conference call. Thus, the office phone can be joined to the conference call, and the user can continue to participate in the conference call through the office phone.

In accordance with another exemplary scenario, a car of a user can include an in-vehicle communications and infotainment system, which can be participating in an active call while the car is parked (e.g., the in-vehicle communications and infotainment system participates in the call without participation of a separate phone). The user can have two Bluetooth devices (e.g., agents) in the car, one headset and one phone. It can be ambiguous which device plays the audio and which microphone picks up the voice subsequent to transfer. The in-vehicle communications and infotainment system can identify that the phone is the source of the communication. Before the leaving the car, the user can tap the Bluetooth headset to the car. Thereafter, the car can transfer the call to the phone while activating the connection through the Bluetooth headset, allowing the headset to be activate when the car is turned off.

Figure 17:
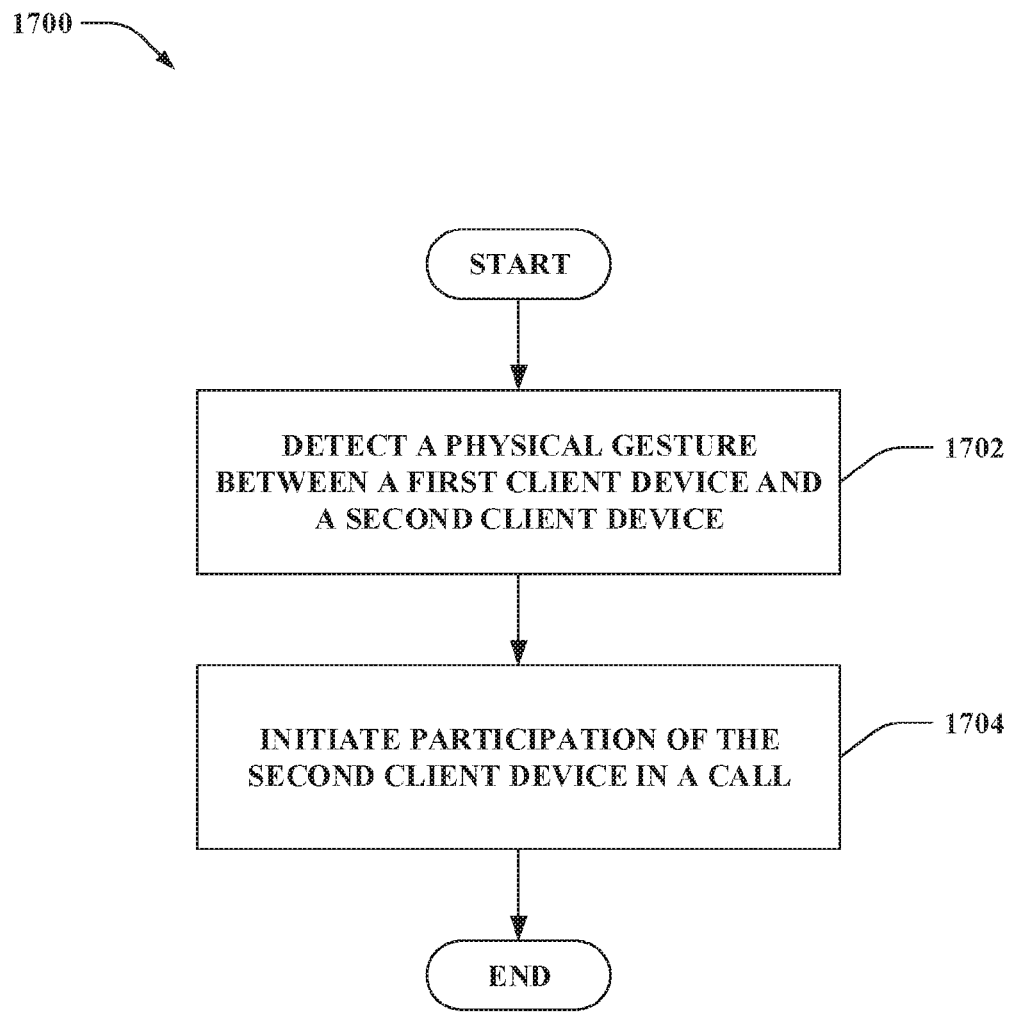
FIG. 17 is a flow diagram that illustrates an exemplary methodology of joining a client device to an existing call.
Figure 18:
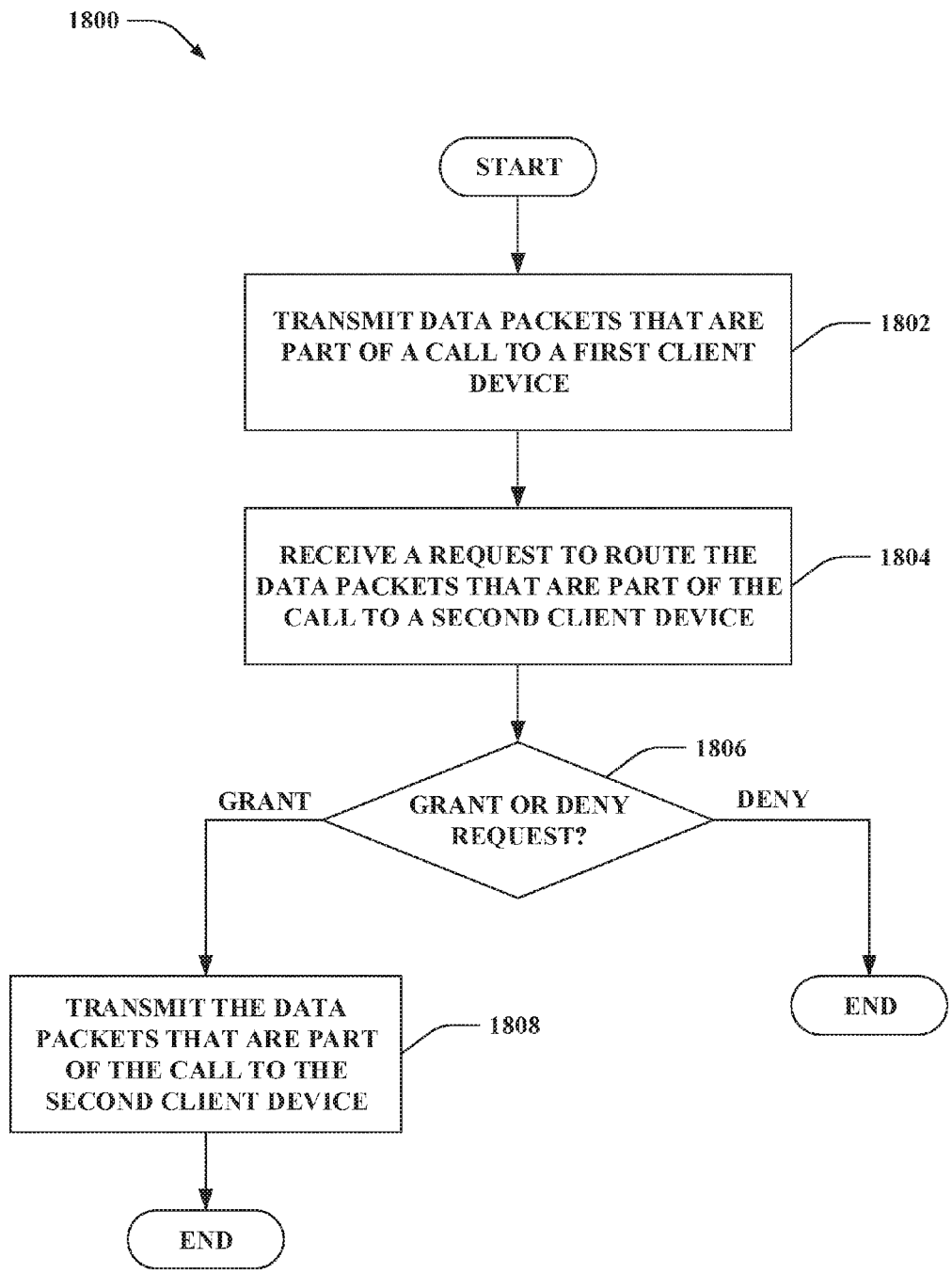
FIG. 18 is a flow diagram that illustrates an exemplary methodology of routing a call.
Figure 19:
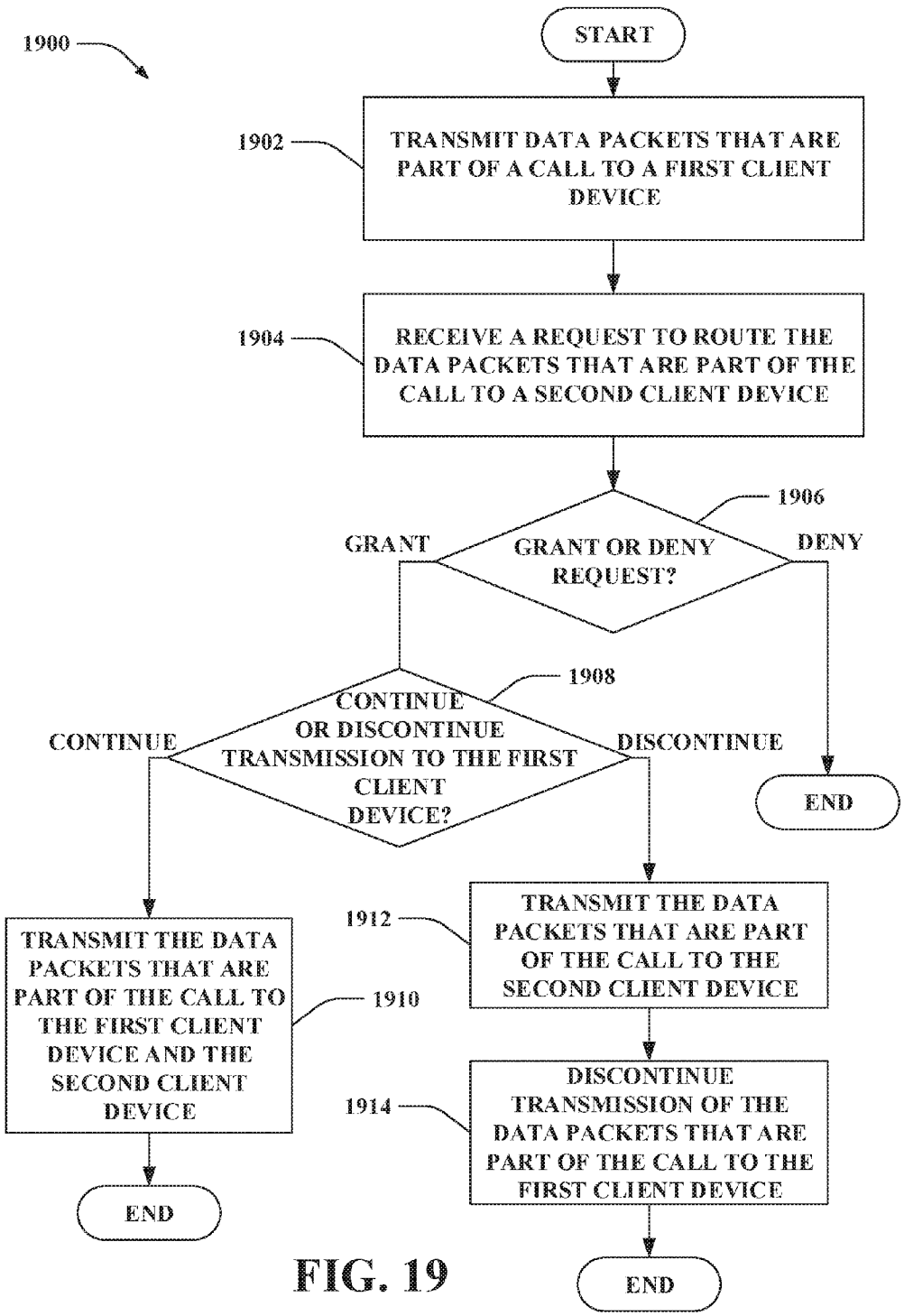
FIG. 19 is a flow diagram that illustrates another exemplary methodology of routing a call.

FIGS. 17-19 illustrate exemplary methodologies relating to initiation of a transfer of a call or a conference call between client devices responsive to detection of a physical gesture. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 17 illustrates a methodology 1700 of joining a client device to an existing call. At 1702, a physical gesture between a first client device and a second client device can be detected. The first client device is participating in a call at the time of detection of the physical gesture. Moreover, the second client device is not participating in the call at the time of the detection of the physical gesture. At 1704, responsive to the detection of the physical gesture, participation of the second client device in the call can be initiated.

According to an example, the physical gesture between the first client device and the second client device can be detected utilizing the first client device. Following this example, participation of the second client device in the call can be initiated from the first client device responsive to the detection of the physical gesture.

Pursuant to another example, the physical gesture between the first client device and the second client device can be detected utilizing the second client device. Accordingly, participation of the second client device in the call can be initiated from the second client device responsive to the detection of the physical gesture.

In accordance with yet another example, the physical gesture between the first client device and the second client device can be detected by a disparate client-side device (e.g., a sensor). Following this example, participation of the second client device in the call can be initiated from the disparate client-side device, the first client device, the second client device, a server, or the like responsive to the detection of the physical gesture.

By way of yet another example, the physical gesture between the first client device and the second client device can be detected by a server. In accordance with such example, participation of the second client device in the call can be initiated from the server responsive to the detection of the physical gesture.

Now turning to FIG. 18, illustrated is a methodology 1800 of routing a call. At 1802, data packets that are part of the call can be transmitted to a first client device. At 1804, a request to route the data packets that are part of the call to a second client device can be received. The request can be responsive to a detected physical gesture between the first client device and the second client device. The request can be received, for example, from the first client device, the second client device, a disparate server, or the like. Moreover, the data packets that are part of the call are not routed to the second client device prior to receipt of the request. At 1806, a determination can be made concerning whether to grant the request or deny the request. If the request is granted at 1806, then the methodology 1800 can continue to 1808. At 1808, the data packets that are part of the call can be transmitted to the second client device. Alternatively, if the request is denied at 1806, then the methodology 1800 can end (e.g., the data packets that are part of the call are not transmitted to the second client device responsive to the request).

With reference to FIG. 19, illustrated is another exemplary methodology 1900 of routing a call. At 1902, data packets that are part of the call can be transmitted to a first client device. At 1904, a request to route the data packets that are part of the call to a second client device can be received. At 1906, a determination can be made concerning whether to grant the request or deny the request. If the request is denied at 1906, then the methodology 1900 ends (e.g., the data packets that are part of the call are not transmitted to the second client device responsive to the request). If the request is granted at 1906, then the methodology can continue to 1908.

At 1908, a determination can be made concerning whether to continue or discontinue transmission to the first client device. Responsive to a determination to continue to transmit to the first client device at 1908, the methodology 1900 can continue to 1910. At 1910, the data packets that are part of the call can be transmitted to the first client device and the second client device.

Alternatively, if a determination is made to discontinue the transmission to the first client device at 1908, then the methodology 1900 can continue to 1912. At 1912, the data packets that are part of the call can be transmitted to the second client device. At 1914, transmission of the data packets that are part of the call can be discontinued to the first client device.

Figure 20:
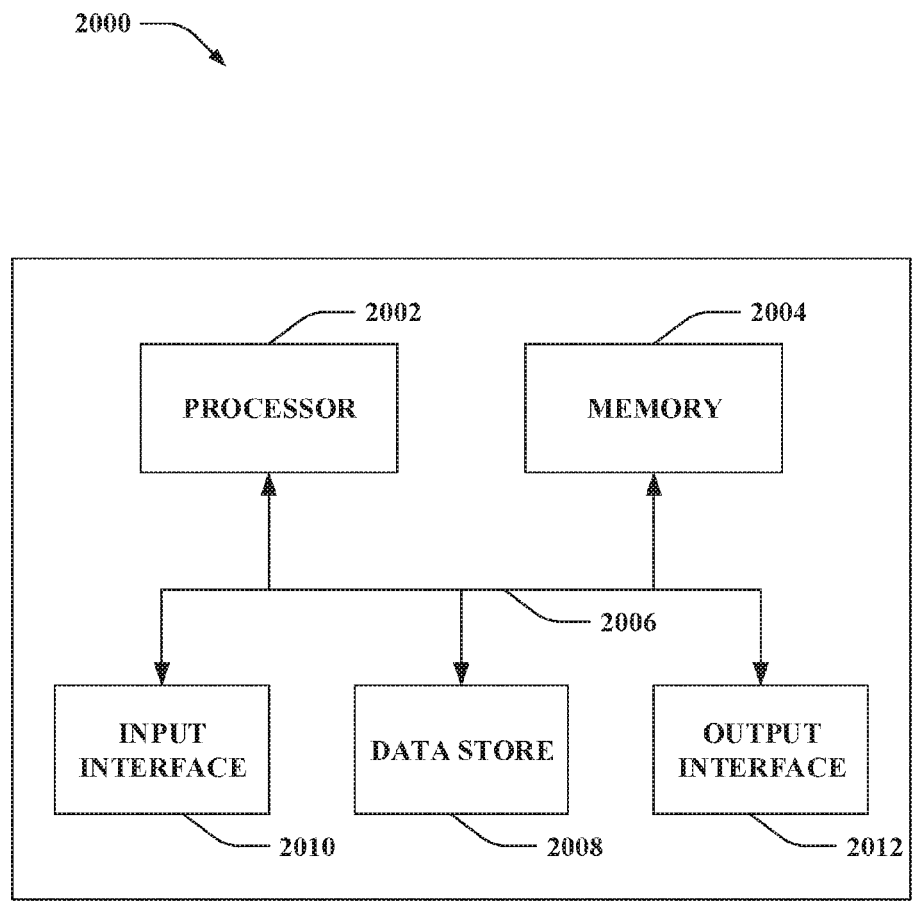
FIG. 20 illustrates an exemplary computing device.

Referring now to FIG. 20, a high-level illustration of an exemplary computing device 2000 that can be used in accordance with the systems and methodologies disclosed herein is illustrated. For instance, the computing device 2000 may be a client device (e.g., the client device A 102, the client device B 104, etc.). By way of another example, the computing device 2000 may be a call server (e.g., the call server 1002). The computing device 2000 includes at least one processor 2002 that executes instructions that are stored in a memory 2004. The instructions may be, for instance, instructions for implementing functionality described as being carried out by one or more components discussed above or instructions for implementing one or more of the methods described above. The processor 2002 may access the memory 2004 by way of a system bus 2006. In addition to storing executable instructions, the memory 2004 may also store identifiers, data pertaining to calls, call access information, and so forth.

The computing device 2000 additionally includes a data store 2008 that is accessible by the processor 2002 by way of the system bus 2006. The data store 2008 may include executable instructions, identifiers, data pertaining to calls, call access information, etc. The computing device 2000 also includes an input interface 2010 that allows external devices to communicate with the computing device 2000. For instance, the input interface 2010 may be used to receive instructions from an external computer device, from a user, etc. The computing device 2000 also includes an output interface 2012 that interfaces the computing device 2000 with one or more external devices. For example, the computing device 2000 may display text, images, etc. by way of the output interface 2012.

It is contemplated that the external devices that communicate with the computing device 2000 via the input interface 2010 and the output interface 2012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 2000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 2000 may be a distributed system. Thus, for instance, several devices may be in communication by way of a network connection and may collectively perform tasks described as being performed by the computing device 2000.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of merging calls, comprising:
detecting a physical gesture between a first client device and a second client device, wherein the first client device is participating in a first call at a time of detection of the physical gesture, the second client device is not participating in the first call at the time of the detection of the physical gesture, the second client device is participating in a second call at the time of the detection of the physical gesture, and the first client device is not participating in the second call at the time of the detection of the physical gesture; and
responsive to the detection of the physical gesture, initiating participation of the second client device in the first call, wherein initiation of the participation of the second client device in the first call combines the first call and the second call such that the second client device is enabled to be used by a user to participate in both the first call and the second call.

2. The method of claim 1, wherein initiating the participation of the second client device in the first call further comprises causing the first call to transfer from the first client device to the second client device, wherein the first client device no longer participates in the first call subsequent to the transfer.

3. The method of claim 1, wherein initiating the participation of the second client device in the first call further comprises causing the second client device to join the first call while the first client device continues to participate in the first call, wherein the first client device is enabled to be used to participate in both the first call and the second call subsequent to the first call and the second call being combined.

4. The method of claim 1, wherein the physical gesture comprises a tap between the second client device and the first client device.

5. The method of claim 1, further comprising:
identifying a gesture type of the physical gesture from a set of possible gesture types, wherein the possible gesture types in the set correspond to differing respective actions pertaining to the first call; and
causing a particular action pertaining to the first call corresponding to the gesture type responsive to the detection of the physical gesture and identification of the gesture type.

6. The method of claim 5, further comprising identifying the gesture type of the physical gesture as a function of a location on a housing at which the physical gesture is detected.

7. The method of claim 5, further comprising identifying the gesture type of the physical gesture as a function of a duration of the physical gesture.

8. The method of claim 5, further comprising identifying the gesture type of the physical gesture as a function of a number of occurrences of the physical gesture.

9. The method of claim 5, further comprising identifying the gesture type of the physical gesture as a function of an orientation of the second client device with respect to the first client device during the physical gesture.

10. The method of claim 1, wherein the physical gesture is detected by a server and the participation of the second client device in the first call is initiated by the server.

11. The method of claim 1, wherein the physical gesture is detected by the first client device and the participation of the second client device in the first call is initiated by the first client device.

12. The method of claim 1, wherein the physical gesture is detected by the second client device and the participation of the second client device in the first call is initiated by the second client device.

13. A client device, comprising:
at least one processor; and
memory that comprises computer-executable instructions that, when executed by the at least one processor, cause the at least one processor to perform acts including:
participating in a call prior to a physical gesture between the client device and a disparate client device; and
subsequent to the physical gesture between the client device and the disparate client device, one of:
continuing to participate in the call, wherein the disparate client device is joined to the call; or
discontinuing to participate in the call, wherein the call is transferred from the client device to the disparate client device;
wherein:
the client device continues to participate in the call with the disparate client device being joined to the call subsequent to the physical gesture when the physical gesture is a first possible gesture type; and
the client device discontinues participation in the call with the call being transferred from the client device to the disparate client device subsequent to the physical gesture when the physical gesture is a second possible gesture type.

14. The client device of claim 13, further comprising:
a display screen; and
the memory further comprising computer-executable instructions that, when executed by the at least one processor, cause the at least one processor to perform acts including:
displaying a prompt on the display screen of the client device responsive to the physical gesture, the prompt solicits user input concerning whether or not to allow the disparate client device to participate in the call;
wherein the client device continues to participate in the call with the disparate client device being joined to the call or the client device discontinues participation in the call with the call being transferred from the client device to the disparate client device only when the user input allows the disparate client device to participate in the call.

15. The client device of claim 13, further comprising:
an accelerometer; and
the memory further comprising computer-executable instructions that, when executed by the at least one processor, cause the at least one processor to perform acts including:
collecting data from the accelerometer; and
transmitting the data from the accelerometer to a server, wherein the server detects the physical gesture based at least in part on the data from the accelerometer.

16. The client device of claim 13, wherein the first possible gesture type is a tap at a first location on a housing of the client device and the second possible gesture type is a tap at a second location on the housing of the client device.

17. The client device of claim 13, further comprising:
at least one near field communication (NFC) chip;
the memory further comprising computer-executable instructions that, when executed by the at least one processor, cause the at least one processor to perform acts including:

detecting the physical gesture and identifying whether the physical gesture is the first possible gesture type or the second possible gesture type based on output from the at least one NFC chip.

18. A client device, comprising:

at least one processor; and memory that comprises computer-executable instructions that, when executed by the at least one processor, cause the at least one processor to perform acts including:
  participating in a call subsequent to a physical gesture between the client device and a disparate client device, wherein the client device is not participating in the call prior to the physical gesture between the client device and the disparate client device;
  wherein the client device participates in the call with the disparate client device continuing to participate in the call subsequent to the physical gesture when the physical gesture is a first possible gesture type; and
  wherein the client device participates in the call with the disparate client device discontinuing to participate in the call subsequent to the physical gesture when the physical gesture is a second possible gesture type.

19. The client device of claim 18, further comprising:

a display screen; and the memory further comprising computer-executable instructions that, when executed by the at least one processor, cause the at least one processor to perform acts including:
  displaying a prompt on the display screen of the client device responsive to the physical gesture, the prompt solicits user input concerning whether or not to allow the client device to participate in the call;
  wherein the client device participates in the call only when the user input allows the client device to participate in the call.

20. The client device of claim 18, the memory further comprising computer-executable instructions that, when executed by the at least one processor, cause the at least one processor to perform acts including:
  participating in a differing call prior to the physical gesture between the client device and the disparate client device;
  wherein the call and the differing call are combined subsequent to the physical gesture.

* * * * *